(12) United States Patent
Rosa

(10) Patent No.: US 8,642,870 B1
(45) Date of Patent: Feb. 4, 2014

(54) MAT AND CARRIER FOR AN OBJECT

(76) Inventor: Noel Rosa, Lakeland, FL (US)

( * ) Notice: Subject to any disclaimer, the term of this patent is extended or adjusted under 35 U.S.C. 154(b) by 304 days.

(21) Appl. No.: 12/928,919

(22) Filed: Dec. 22, 2010

Related U.S. Application Data

(60) Provisional application No. 61/284,815, filed on Dec. 23, 2009.

(51) Int. Cl.
*G10D 9/00* (2006.01)

(52) U.S. Cl.
USPC .......................................................... 84/453

(58) Field of Classification Search
USPC .......................................................... 84/453
See application file for complete search history.

(56) References Cited

U.S. PATENT DOCUMENTS

| | | | | |
|---|---|---|---|---|
| 3,096,677 A * | 7/1963 | Ryan | ................................ | 84/421 |
| 3,575,327 A * | 4/1971 | Harrison | ........................ | 294/149 |
| 4,240,646 A * | 12/1980 | Scott | ................................ | 280/30 |
| 4,334,612 A * | 6/1982 | Beato | ............................. | 206/314 |
| 4,337,812 A * | 7/1982 | Trinkner | ........................... | 383/4 |
| 4,441,398 A * | 4/1984 | Baker | ............................. | 84/421 |
| 4,445,415 A * | 5/1984 | Izquierdo | ........................ | 84/177 |
| 4,461,332 A * | 7/1984 | Parkhurst | ........................ | 150/112 |
| 4,682,691 A * | 7/1987 | Spiering | ........................ | 206/373 |
| 4,865,097 A * | 9/1989 | Allen | ............................. | 150/154 |
| 5,002,401 A * | 3/1991 | Blackman | ........................ | 383/38 |
| 5,139,143 A * | 8/1992 | Pond | ............................. | 206/373 |
| 5,427,239 A * | 6/1995 | Hunt | ............................. | 206/372 |
| 5,866,829 A * | 2/1999 | Pecoraro | ........................ | 84/177 |
| 5,994,634 A * | 11/1999 | Cady | ............................. | 84/421 |
| 6,152,300 A * | 11/2000 | Perkins | ........................ | 206/373 |
| 6,209,723 B1 * | 4/2001 | Fields | ............................ | 206/373 |
| 6,215,055 B1 * | 4/2001 | Saravis | ........................ | 84/422.1 |
| 6,459,023 B1 * | 10/2002 | Chandler | ........................ | 84/177 |
| 6,538,185 B1 | 3/2003 | Stratton | | |
| 6,723,909 B1 * | 4/2004 | Hooper, II | ........................ | 84/453 |
| 6,874,624 B2 * | 4/2005 | Redzisz | ........................ | 206/278 |
| 7,028,870 B2 * | 4/2006 | Valdez-Campbell | ......... | 224/153 |
| D520,553 S * | 5/2006 | Bogdan et al. | .................. | D17/20 |
| 7,485,792 B2 * | 2/2009 | Collins, Sr. | .................. | 84/422.1 |
| 8,157,068 B2 * | 4/2012 | Sapyta | ........................ | 190/109 |
| 2004/0250673 A1 * | 12/2004 | Salerno | ........................... | 84/746 |

* cited by examiner

*Primary Examiner* — Robert W Horn
(74) *Attorney, Agent, or Firm* — Frijouf, Rust & Pyle, P.A.

(57) ABSTRACT

A mat is disclosed for engaging an object. A surface supports the mat. The mat comprises a flexible sheet defining a top surface, a bottom surface and an outer edge. A gripper layer is coupled to the bottom surface for resisting displacement of the flexible sheet relative to the surface. A top hook and loop layer is coupled to the top surface of the flexible sheet. An object hook and loop layer is coupled to the object. The top hook and loop layer and the object hook and loop layer interlock for coupling the object to the flexible sheet.

28 Claims, 15 Drawing Sheets

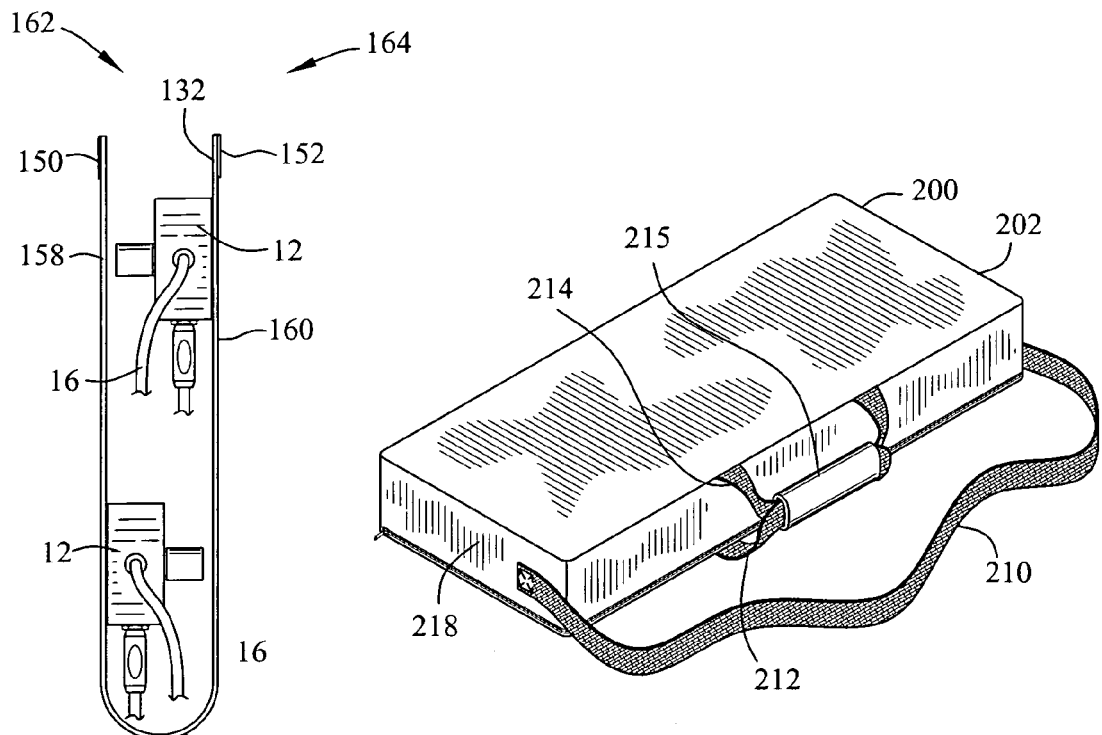
FIG. 12
FIG. 13
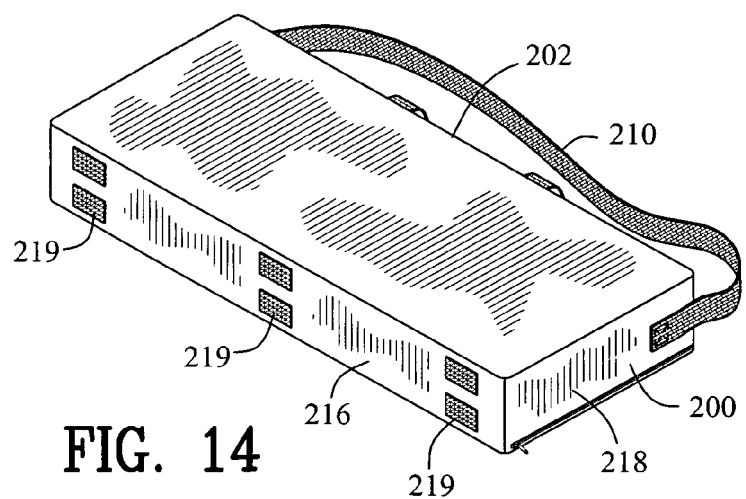
FIG. 14

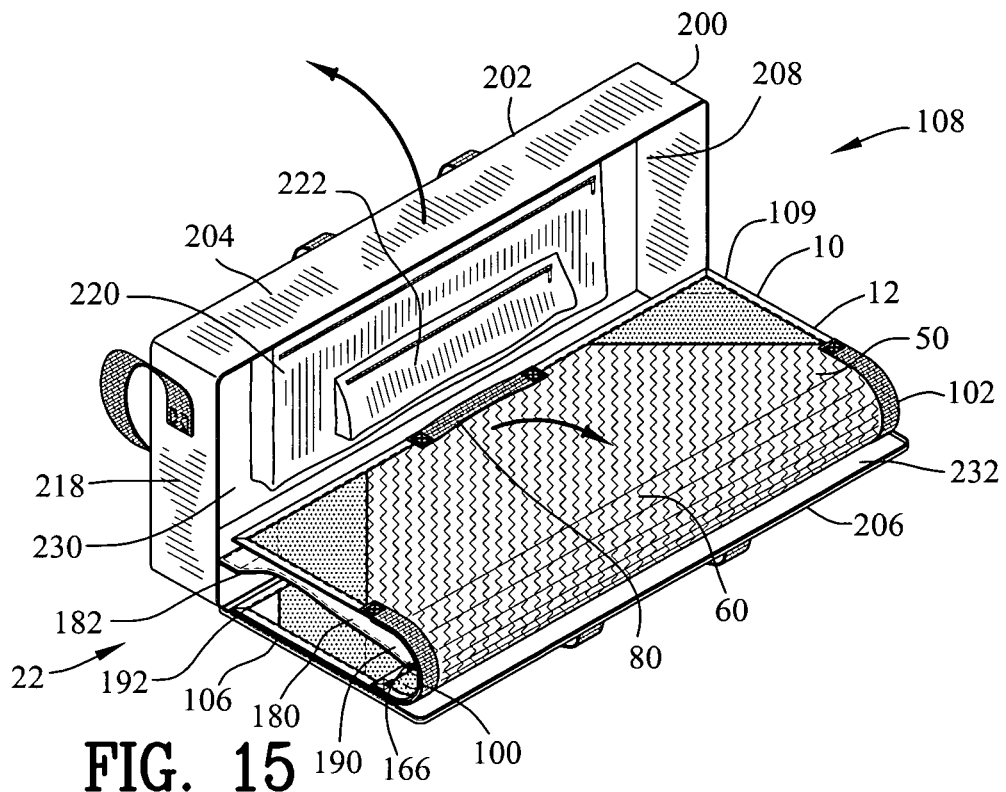

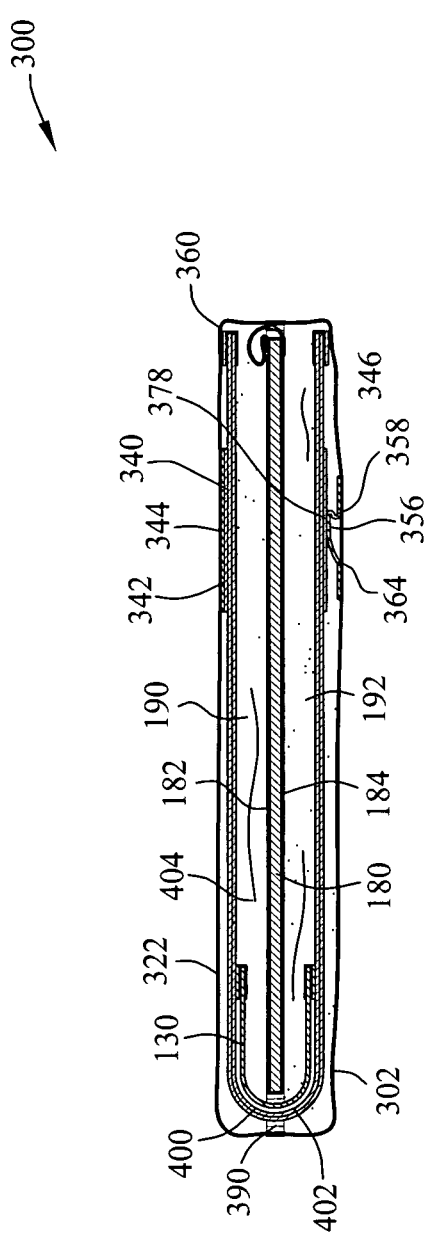
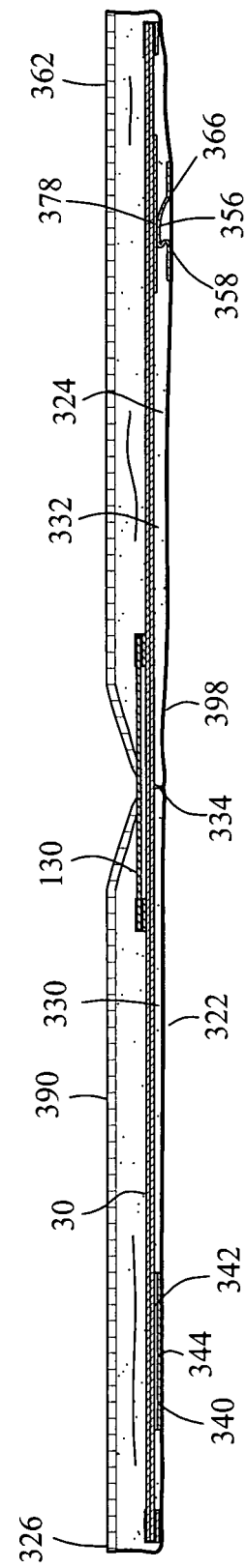

MAT AND CARRIER FOR AN OBJECT

CROSS-REFERENCE TO RELATED APPLICATIONS

This application claims benefit of U.S. Patent Provisional application Ser. No. 61/284,815 filed Dec. 23, 2009. All subject matter set forth in provisional application Ser. No. 61/284,815 is hereby incorporated by reference into the present application as if fully set forth herein.

BACKGROUND OF THE INVENTION

1. Field of the Invention

This invention relates to mats and more particularly to an electrical pedal mat and carrier for engaging an electrical pedal component.

2. Background of the Invention

Following the invention of the solid body electric guitar in the mid 1940's, consistent improvements and innovations have been made to the instrument and it's support accessories. Eventually, the development of electric base guitars followed. Starting in the 1960's, musicians began experimenting with various sound and tone modulating devices designed to create various effects. Typically, these effects or so called "stomp boxes" are constructed in small metal boxes and are activated by foot switches. A modern musician may have upwards of 10 or more individual effects boxes in use at any one time. Transporting these devices without loss or damage became a problem for the musician. Additionally, the time required to organize and assemble the effects boxes and their associated wiring and power supplies became a set-up problem. The development of an accessory device known as a pedal board or pedal mat attempted to solve these problems. The typical pedal board or pedal mat has each of the effects boxes mounted thereon, allowing the organization of the effects boxes to be consistent. Set-up time is also substantially reduced.

There have been many in the prior art who have attempted to solve these problems with varying degrees of success. None, however completely satisfies the requirements for a complete solution to the aforestated problem. The following United States Patents and patent applications are attempts of the prior art to solve this problem.

U.S. Pat. No. 4,334,612 to Beato discloses a relatively pliable device upon which equipment may stand when in normal use and to which the equipment may be fastened for transport and storage. The device may comprise a carpet having a substantially skid-proof pile surface and a backing. A water impervious material may be bonded to the backing and a number of fastening straps may be anchored to the carpet. When equipment is fastened to the carpet by the anchor straps, the carpet may be rolled into a cylindrical configuration in which it may be held by a plurality of exterior straps. A moveable shoulder strap may be fastened to the exterior straps for ease in carrying and handling the device. A wheeled cap may be mounted on one end of the carpet so that a person transporting it need not bear the entire weight.

U.S. Pat. No. 4,445,415 to Izzquierdo discloses a box with a removable top and a hingable side part for closing into a case to store and carry effects control pedals and miscellaneous gear of a keyboard stand, and opening into a stand for supporting a keyboard in playing position relative to operationally fixed and connected pedals and gear.

U.S. Pat. No. 5,866,829 to Pecoraro discloses a pedal rack comprising a case with a plurality of a variety of electronic components that may be electrically connected together and retained within the case. A sound control unit may be electrically connected to the electronic components. A facility is for pivotally mounting the sound control unit within the case. The sound control unit can go between a generally horizontal storage position "A" over the electronic components and into an upright operational position "B" for easy access. The sound control unit may also be completely removed from the case.

U.S. Pat. No. 6,215,055 to Saravis discloses a pedal board for releasably retaining a plurality of foot pedal operated sound effect generators used in conjunction with musical instruments, such as guitars. The pedal board comprises an upper plate having a surface constructed to releasably hold a plurality of foot pedal operated sound effect generators. The pedal board is provided with an internal wiring harness and external jacks for connection of the sound effect generators in a desired array and which enable connection to the musical instrument as well as to an auxiliary sound generating component used with the musical instrument.

U.S. Pat. No. 6,459,023 to Chandler discloses an effect support board including an effect mounting surface adapted to mount a guitar effect and including a cable connection opening adapted to allow the cable to pass from beneath the effect mounting surface for connection to the guitar effect on top of the effect mounting surface. The effect mounting surface supported by a frame.

U.S. Pat. No. 6,538,185 to Stratton discloses a pedal board assembly for receiving a plurality of musical sound effect generators generally comprising a box-like receptacle with a removable lid. The receptacle contains a top tier of flat, fixed pitch panels including a power supply and an audio circuit interface. A middle tier is of a fixed, tilted pitch and a lower tier is of selectively flat or tilted pitch mode, the tilted pitch mode matching the pitch of the middle tier so that large sound effect generators may be placed across to span both the middle tier and the lower tier.

U.S. Pat. No. 6,723,909 to Hooper, II discloses a new system for simplifying the transport, set-up and use of electrically amplified musical instruments such as guitars and electric bases. It is comprised of a combination of components that are normally carried and set-up separately by the performer and thereby saves the performer considerable time and effort in transport and set-up of his equipment. Included in the invention are an integrated accessory case, guitar stand and pedal effects board. Additional features provide the special protection required for effects pedals during transport.

U.S. Pat. No. 7,485,792 to Collins, Sr. discloses a musical effects pedal retaining unit comprising a retaining body, a retaining means affixed to said retaining body by retaining means connectors and an attachment surface fixed to said retaining body. This pedal retaining unit is preferably used with a pedal board system to secure at least one musical effect pedal while simultaneously preserving the effects pedal.

United States Patent Application 2004/0250673 to Salerno discloses an ergonomic pedal board comprising a non-orthogonal shaped body plate with a cooperative loop fabric surface to releasably mount one or more effects pedals. Rubber feet are attached to the underside of body plate in three locations that provide tripodal support for stability on uneven or non-level surfaces. Effects pedals are releasably mounted in staggered array with audio jacks unobstructed, facilitating a natural arc of foot movement when actuating pedals by foot. A slotted handle is incorporated into body plate that attaches to the vertical tube of a microphone stand. The forward end of body plate is supported by the microphone stand's base. This support elevates the forward end of pedal board and weights base of microphone stand. A receptacle is provided in the forward end of body plate that accepts a gooseneck lamp for illumination of pedal board and effects pedals in conditions of low ambient light. The gooseneck lamp's DC power jack accepts a source of DC power common to effects pedals that are mounted proximate to gooseneck lamp.

Although the aforementioned prior art have contributed to the development of the art of managing a number of musical instrument effects boxes and accessories, none of these prior art patents have solved the needs of this art.

Therefore, it is an object of the present invention to provide an improved apparatus for managing a number of musical instrument effects boxes and accessories.

Another object of this invention is to provide an improved apparatus for safely transporting musical instrument effects boxes and accessories.

Another object of this invention is to provide an improved pedal mat apparatus that is simple for the operator to use.

Another object of this invention is to provide an improved pedal mat apparatus that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a mat for engaging an object. A surface supports the mat. The mat comprises a flexible sheet defining a top surface, a bottom surface and an outer edge. A gripper layer is coupled to the bottom surface for resisting displacement of the flexible sheet relative to the surface. A top hook and loop layer is coupled to the top surface of the flexible sheet. An object hook and loop layer is coupled to the object. The top hook and loop layer and the object hook and loop layer interlock for coupling the object to the flexible sheet.

In a more specific embodiment of the invention, the mat includes an electrical pedal mat and the object includes an electrical pedal component. The electrical pedal component is electrically coupled to a musical instrument by an electrical conduit. The flexible sheet defines an upper flexible sheet and a lower flexible sheet. The upper flexible sheet has a top surface, a bottom surface and an outer edge. The lower flexible sheet has a top surface, a bottom surface and an outer edge. The upper flexible sheet is coupled to the lower flexible sheet with the bottom surface of the upper flexible sheet positioned adjacent to the top surface of the lower flexible sheet for defining a flexible sheet chamber there between. A gripper layer is coupled to the bottom surface of the lower flexible sheet for resisting displacement of the lower flexible sheet relative to the surface. A top hook and loop layer is coupled to the top surface of the upper flexible sheet. A pedal hook and loop layer is coupled to the electrical pedal component. The top hook and loop layer and the pedal hook and loop layer interlock for coupling the electrical pedal component to the upper flexible sheet.

In one embodiment of the invention, the flexible sheet includes a sheet fold for defining a crease interposed between a first sheet side and a second sheet side. The first sheet side and the second sheet side define a sheet channel for housing and protecting the electrical pedal component. A first sheet handle is secured to the first sheet side. A second sheet handle is secured to the second sheet side. The first sheet handle and the second sheet handle are positioned adjacent to the outer edge on the flexible sheet for grasping the flexible sheet when the flexible sheet has the sheet fold.

In another embodiment of the invention, a flexible cap sheet defines a top cap surface, a bottom cap surface and an outer cap edge. A bottom cap hook and loop layer is coupled to the bottom cap surface for interlocking with the top hook and loop layer of the upper flexible sheet for coupling the flexible cap sheet to the flexible sheet. A top cap hook and loop layer is coupled to the top cap surface of the flexible cap sheet. A pedal cap hook and loop layer is coupling to the electrical pedal component. The top cap hook and loop layer and the pedal cap hook and loop layer interlocking for coupling the electrical pedal component to the flexible cap sheet.

In another embodiment of the invention carrier transports the electrical pedal mat. The electrical pedal mat engages an electrical pedal component. The carrier and electrical pedal mat comprise a case having a body and closure wall pivotably mounted to the body. The body defines a case chamber. An insert panel is removably secured within the case chamber. The insert panel defines a first case chamber and a second case chamber within the body. The insert panel is positioned within the sheet channel for positioning the first sheet side within the first case chamber and the second sheet side within the second case chamber. The first case chamber and the second case chamber housing and protecting the electrical pedal component.

In another embodiment of the invention, a receptacle receives an object. The surface supports the receptacle. The receptacle comprises a flexible sheet defining a top surface, a bottom surface and an outer edge. The flexible sheet has a first sheet half and a second sheet half coupled by a crease area. A top hook and loop layer is coupled to the top surface of the flexible sheet. The object hook and loop layer is coupled to the object. The top hook and loop layer and the object hook and loop layer interlock for coupling the object to the flexible sheet. A carrier defines an exterior surface, an interior surface and an outer rim. The carrier has a first carrier panel and a second carrier panel coupled by a carrier spine. A first sheet hook and loop layer is coupled to the bottom surface and the first sheet half of the flexible sheet. A carrier hook and loop layer is coupled to the interior surface and the first carrier panel of the carrier. The first sheet hook and loop layer is removably coupling with the carrier hook and loop layer for defining a static attachment between the flexible sheet and the carrier. A second sheet hook and loop layer is coupling to the bottom surface and the second sheet half of the flexible sheet. A band hook and loop is coupled to the interior surface and the second carrier panel of the carrier. The band hook and loop defines a flexible hook and loop belt positioned between a first mounting end and a second mounting end. The first mounting end and the second mounting end are coupled to the interior surface and the second carrier panel of the carrier for defining a bulbous loop in the flexible hook and loop belt that is distanced from the interior surface. The second sheet hook and loop layer is removably coupled with the flexible hook and loop belt for defining a dynamic attachment between the flexible sheet and the carrier. The flexible sheet and the carrier fold upon the crease area and the carrier spine respectively for positioning the first sheet half adjacent to the second sheet half of the flexible sheet and the first carrier panel adjacent to the second carrier panel of the carrier for defining a fold position. The first sheet half, the second sheet half and the crease area of the flexible sheet align and the first carrier panel, the second carrier panel and the carrier spine of the carrier align for defining an utility position wherein the surface supporting the carrier. The bulbous loop has a first yieldable position during the carrier and the flexible sheet in the folded position. The bulbous loop has a second yieldable position during the carrier and the flexible sheet in the utility position. The dynamic attachment permits the independent displacement of the flexible sheet relative to the carrier during transitioning between the folding position and the utility position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 12 is a side view of FIG. 11;

FIG. 13 is a front isometric view of a case having a body and a closure wall for receiving the electrical pedal mat;

FIG. 14 is a rear isometric view of FIG. 13;

FIG. 15 is a view similar to FIG. 13 illustrating the body pivotably displaced from the closure wall to expose the electrical pedal mat and an insert panel positioned within the cap fold of the electrical pedal mat;

FIG. 16 is a view similar to FIG. 15 illustrating the cap fold being removed from the electrical pedal mat for removing the electrical pedal mat from the case and the insert panel being pivotably mounted to the body of the case;

FIG. 31 is a sectional view along line 31-31 in FIG. 27; and

FIG. 32 is a sectional view along line 32-32 in FIG. 29.

Similar reference characters refer to similar parts throughout the several Figures of the drawings.

DETAILED DISCUSSION

Figure 2:
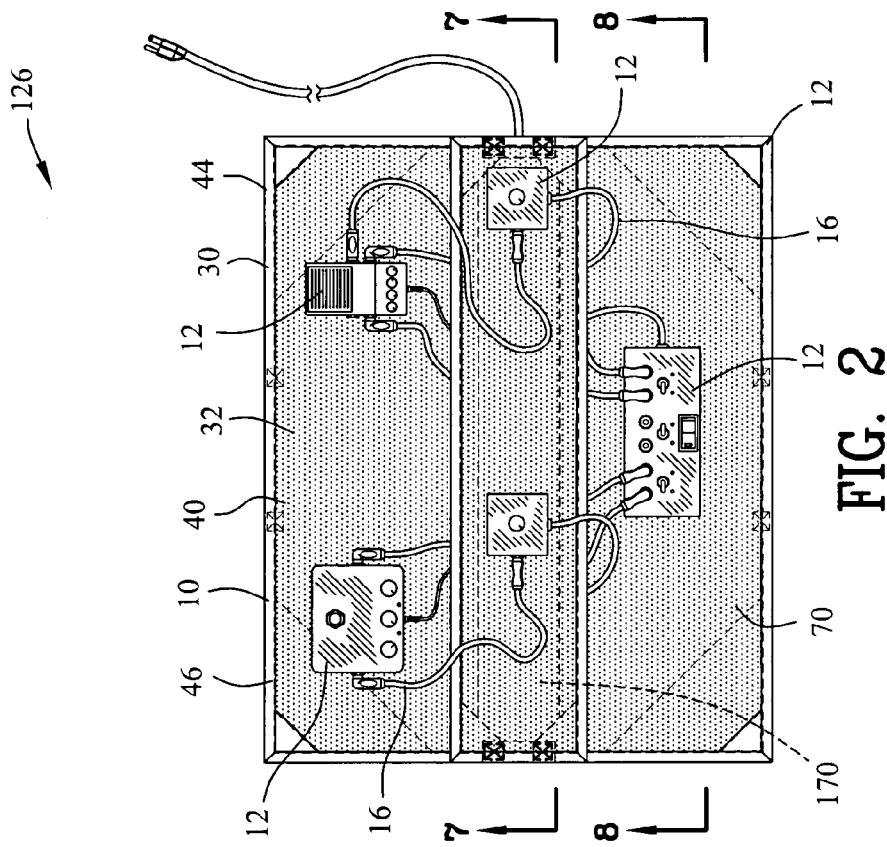
FIG. 2 is a top view of FIG. 1.
Figure 1:
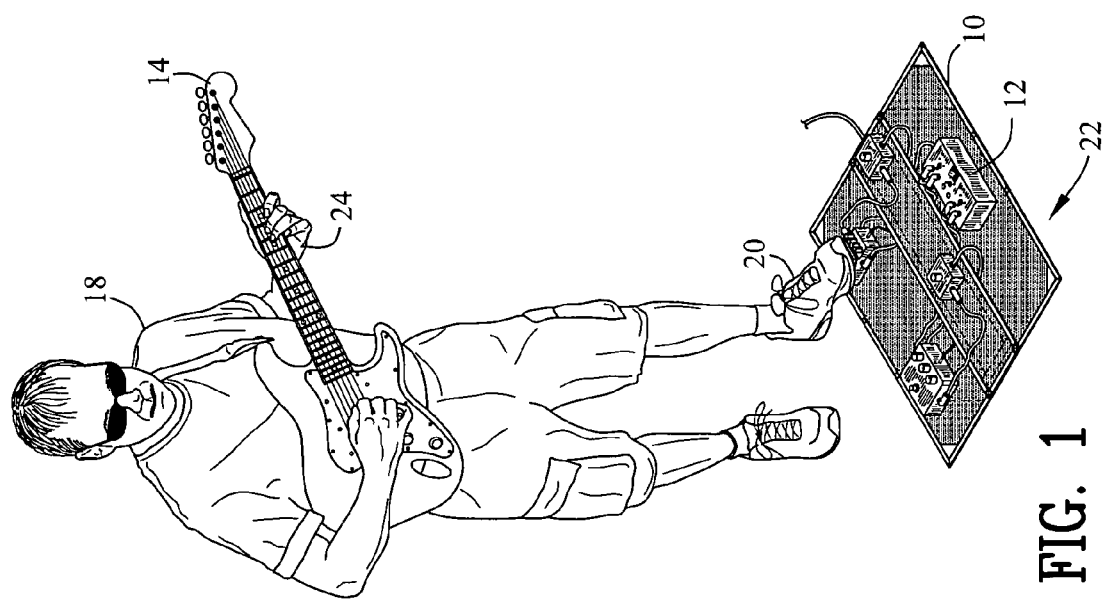
FIG. 1 is a top isometric view of an electrical pedal mat of the present invention for engaging an electrical pedal component.

FIGS. 1-8 are various views of a mat or electrical pedal mat 10 for engaging an object or electrical pedal component 12. The electrical pedal component 12 is electrically coupled to a musical instrument 14 by an electrical conduit 16. An individual 18 may operate the electrical pedal component 12 by depressing the electrical pedal component 12 by a foot 20 of the individual 18. A surface 22 supports the electrical pedal mat 10.

The electrical pedal mat 10 includes a flexible sheet 30 defining an upper flexible sheet 32 and a lower flexible sheet 34. The flexible sheet 30 may be constructed of a woven polymeric material or other suitable materials. The upper flexible sheet 32 has a top surface 40, a bottom surface 42 and an outer edge 44. Similarly, the lower flexible sheet 34 has a top surface 50, a bottom surface 52 and an outer edge 54. The flexible sheet 30 is shown as a rectangle 38 including four right angles 39 however the flexible sheet 30 may also include various other geometric shapes such as a square or circle.

Figure 3:
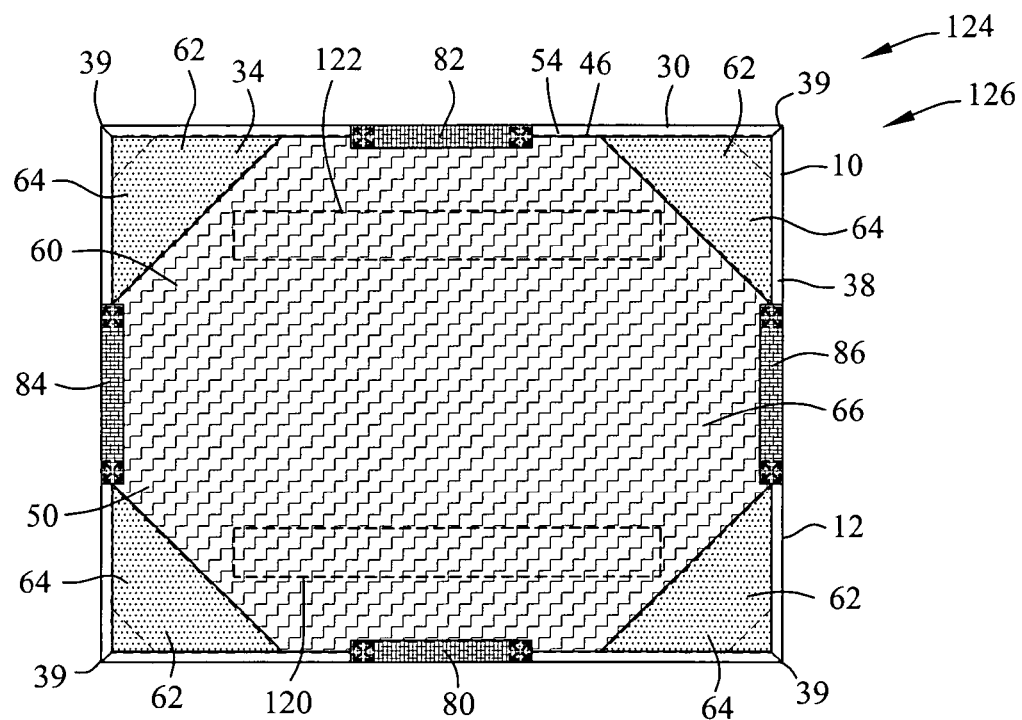
FIG. 3 is a bottom view of FIG. 2.
Figure 4:
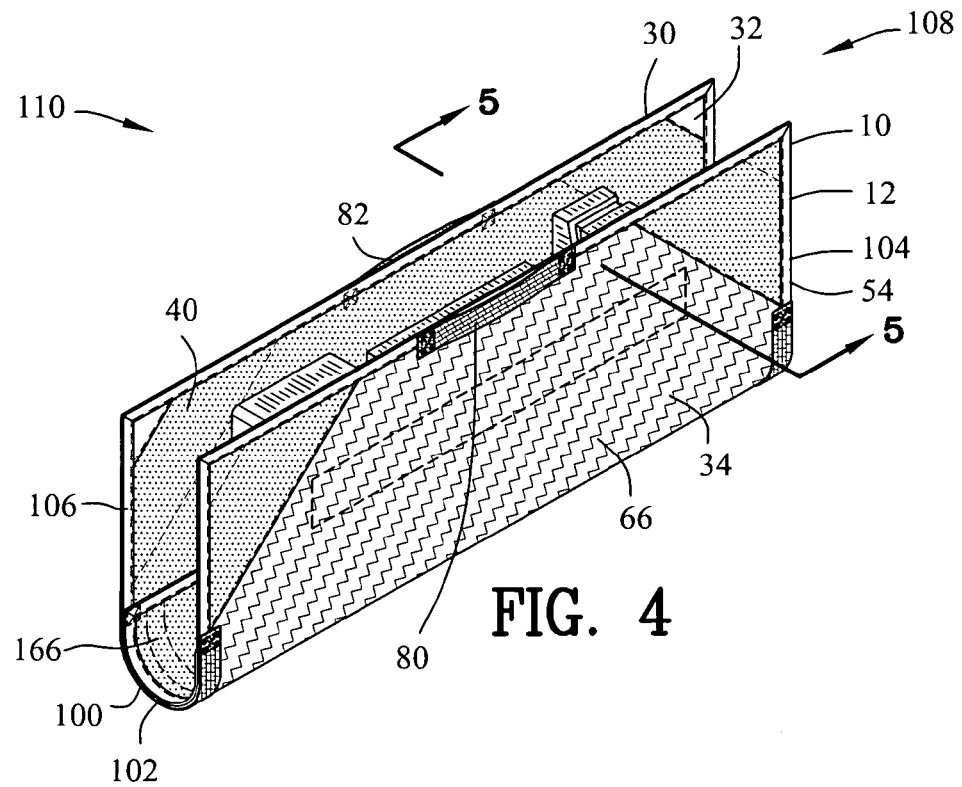
FIG. 4 is a front isometric view of the electrical pedal mat in FIG. 2 including a sheet fold for defining a crease interposed between a first sheet side and a second sheet side for housing and protecting the electrical pedal component.

The upper flexible sheet 32 is coupled to the lower flexible sheet 34 with the bottom surface 42 of the upper flexible sheet 32 positioned adjacent to the top surface 50 of the lower flexible sheet 34. The upper flexible sheet 32 may be coupled to the lower flexible sheet 34 by a plurality of stitches 46 adjacent to the outer edges 44 and 54. The upper flexible sheet 32 and the lower flexible sheet 34 define a flexible sheet chamber 36 there between;

As best seen in FIGS. 3 and 4, a gripper layer 60 is coupled to the bottom surface 52 of the lower flexible sheet 34 for resisting displacement of the lower flexible sheet 34 relative to the surface 22. The gripper layer 60 may include a bottom hook and loop layer 62. The bottom hook and loop layer 62 may include a plurality of triangular hook and loop layers 64 position adjacent to the four right angles 39. Alternatively or in combination, the gripper player 60 may include a polymeric layer 66 for resisting displacement of the lower flexible 34 sheet relative to the surface 22.

As seen in FIGS. 1-8, a top hook and loop layer 70 is coupled to the top surface 40 of the upper flexible sheet 32. The top hook and loop layer 70 may be secured to the top surface 40 of the upper flexible sheet 32 by a plurality of stitches 46. An object or pedal hook and loop layer 72 is coupled to the electrical pedal component 12. The pedal hook and loop layer 72 has an adhesive backing 74 that secures the pedal hook and loop layer 72 to the electrical pedal component 12. The top hook and loop layer 70 and the pedal hook and loop layer 72 interlock for coupling the electrical pedal component 12 to the upper flexible sheet 32. Since the top hook and loop layer 70 extends over the entire surface of the upper flexible sheet 32, one or more of the electrical panel component 12 may be positioned in multiple configurations and locations on the upper flexible sheet 32. Furthermore, the removable coupling between the top hook and loop layer 70 and the pedal hook and loop layer 72 permits one or more electrical panel component 12 to be removed from the electrical pedal mat 10 and replaced with another electrical panel component 12.

Figure 23:
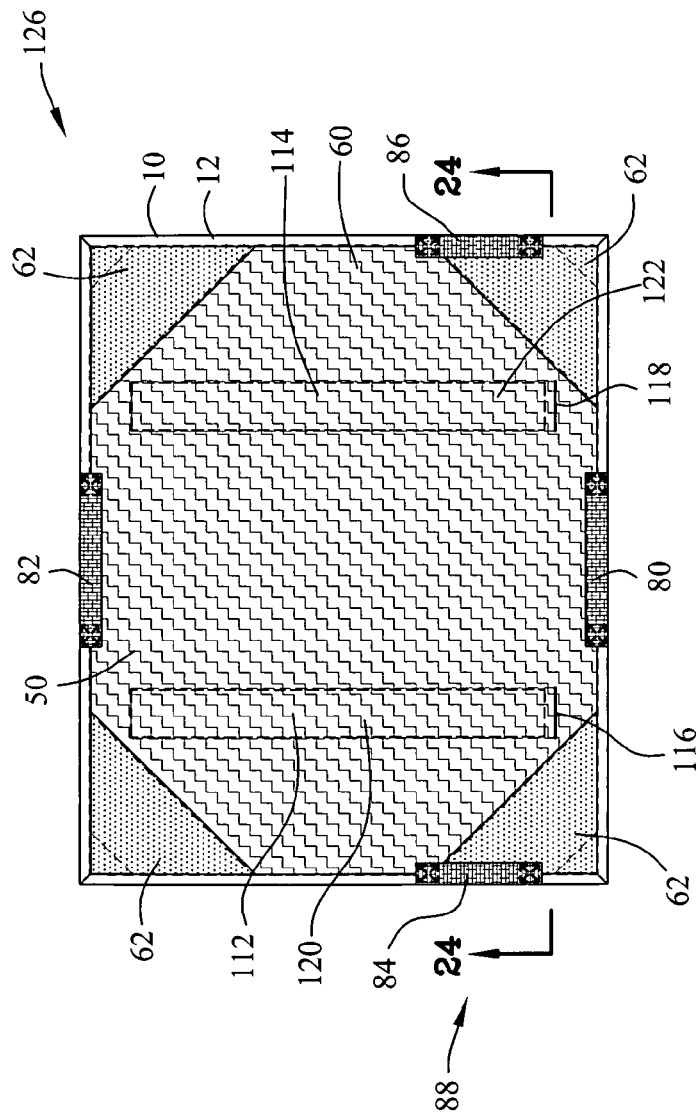
FIG. 23 is a view similar to FIG. 3 illustrating a first reinforcing rib and a second reinforcing rib that are receiving by the electrical pedal mat for stiffening the electrical pedal mat.
Figure 24:
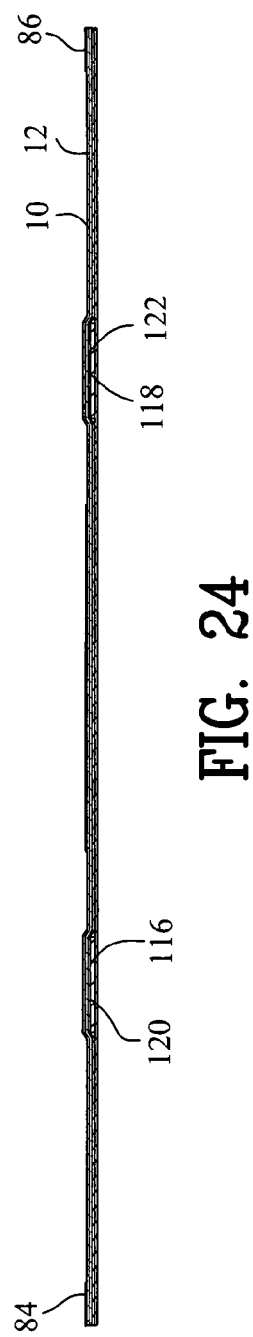
FIG. 24 is a sectional view along line 24-24 in FIG. 23.
Figure 25:
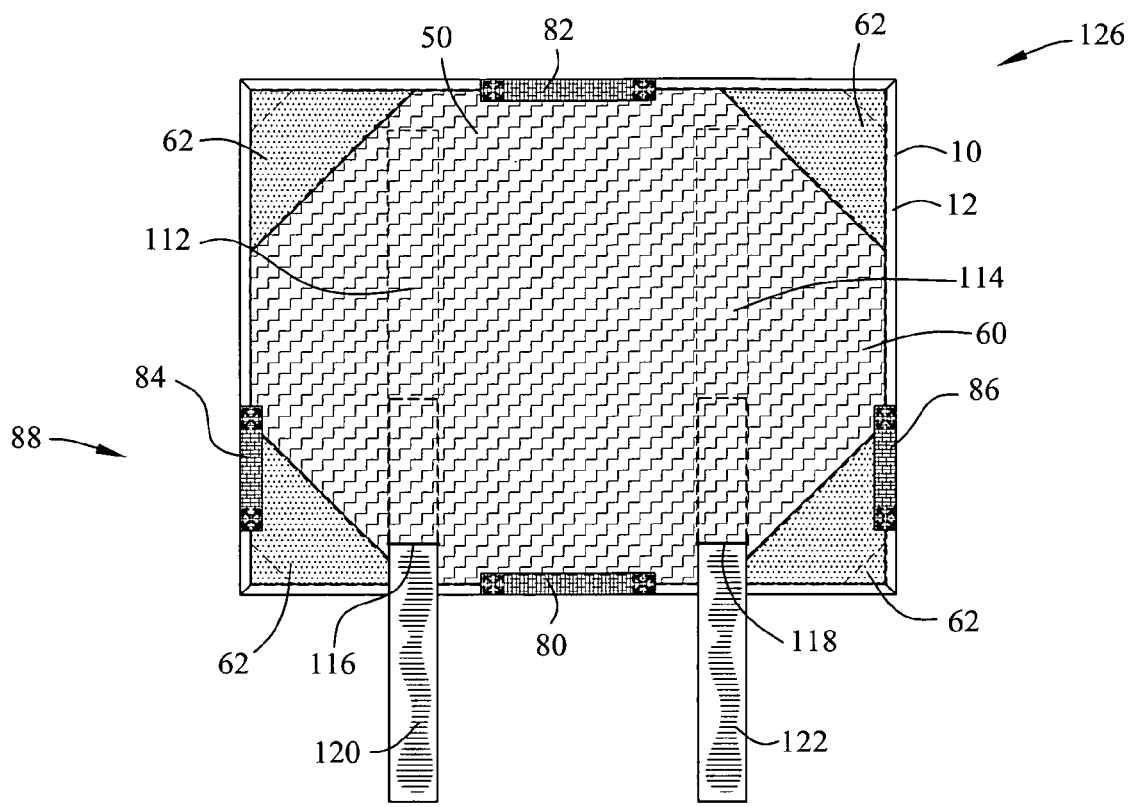
FIG. 25 is a view similar to FIG. 23 illustrating the first reinforcing rib and the second reinforcing rib being removably secured within the electrical pedal mat.
Figure 26:
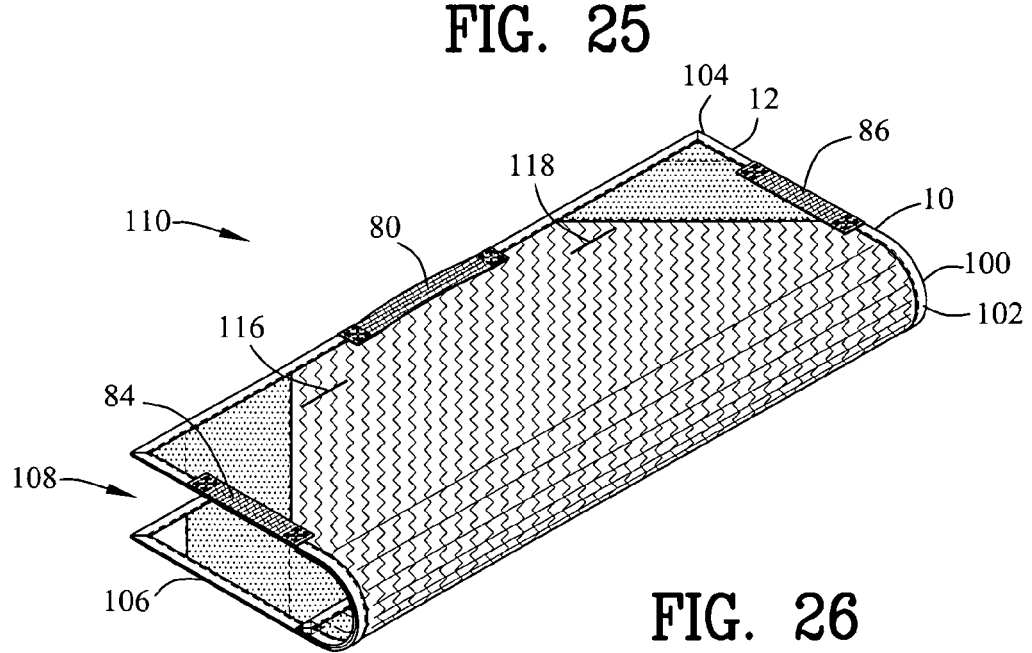
FIG. 26 illustrates the electrical pedal mat of FIG. 25 including the sheet fold after the first reinforcing rib and the second reinforcing rib are removed from the electrical pedal mat.
Figure 27:
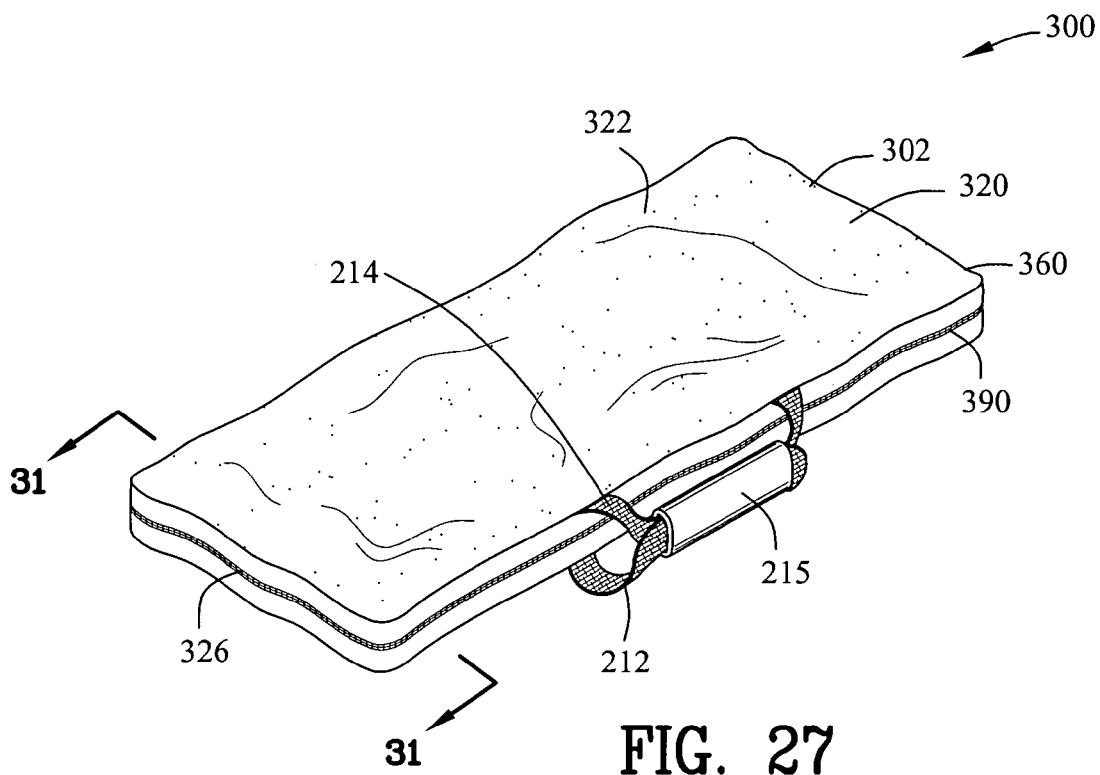
FIG. 27 is a front isometric view of a third embodiment of the present invention wherein the electrical pedal mat may be utilized while engaging a flexible case.
Figure 28:
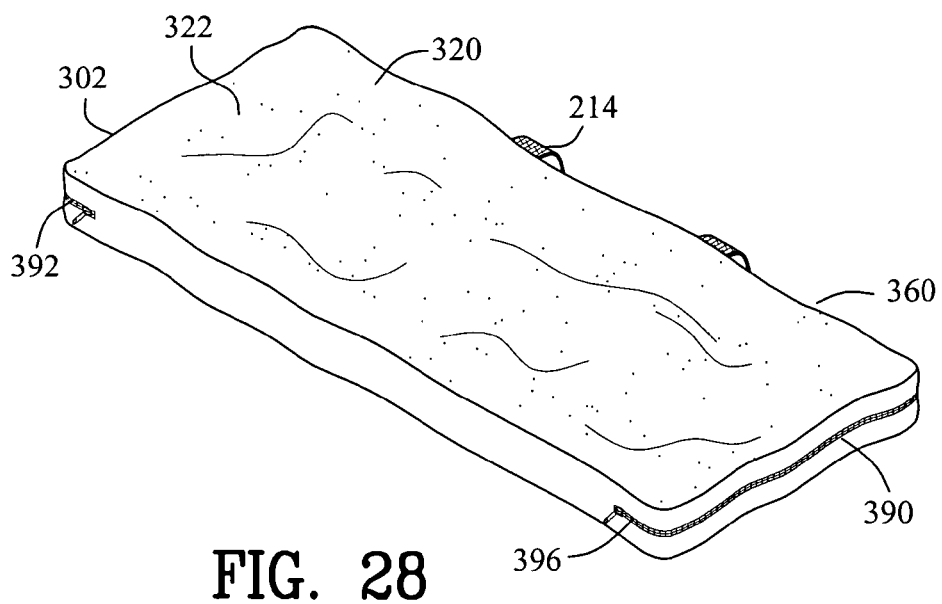
FIG. 28 is a rear isometric view of FIG. 27.
Figure 29:
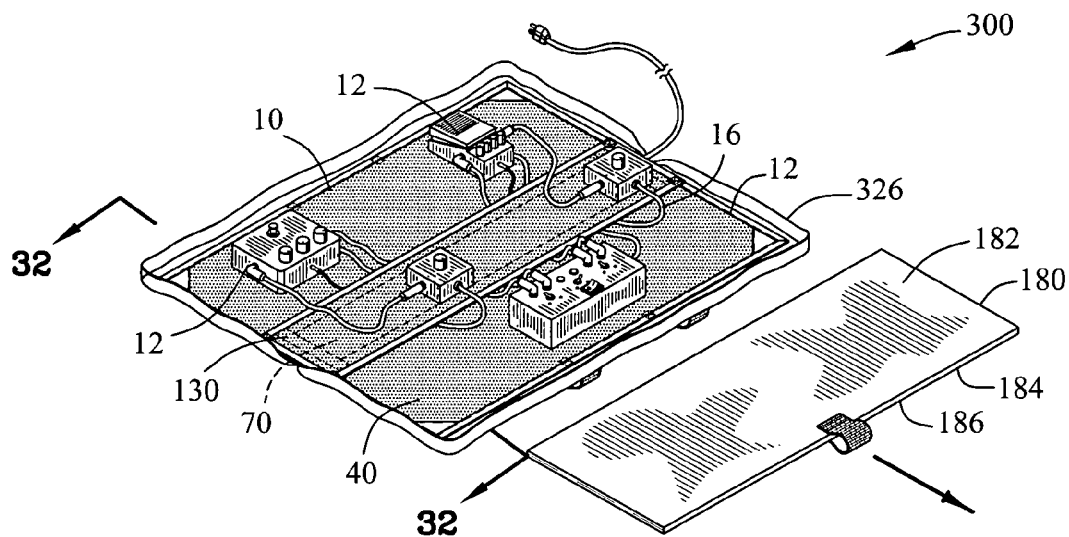
FIG. 29 is a front isometric view of the flexible case in FIG. 27 in an open position for exposing the electrical pedal mat and illustrating the electrical pedal mat coupled with the flexible case in an utility position and the insert panel being removed.
Figure 30:
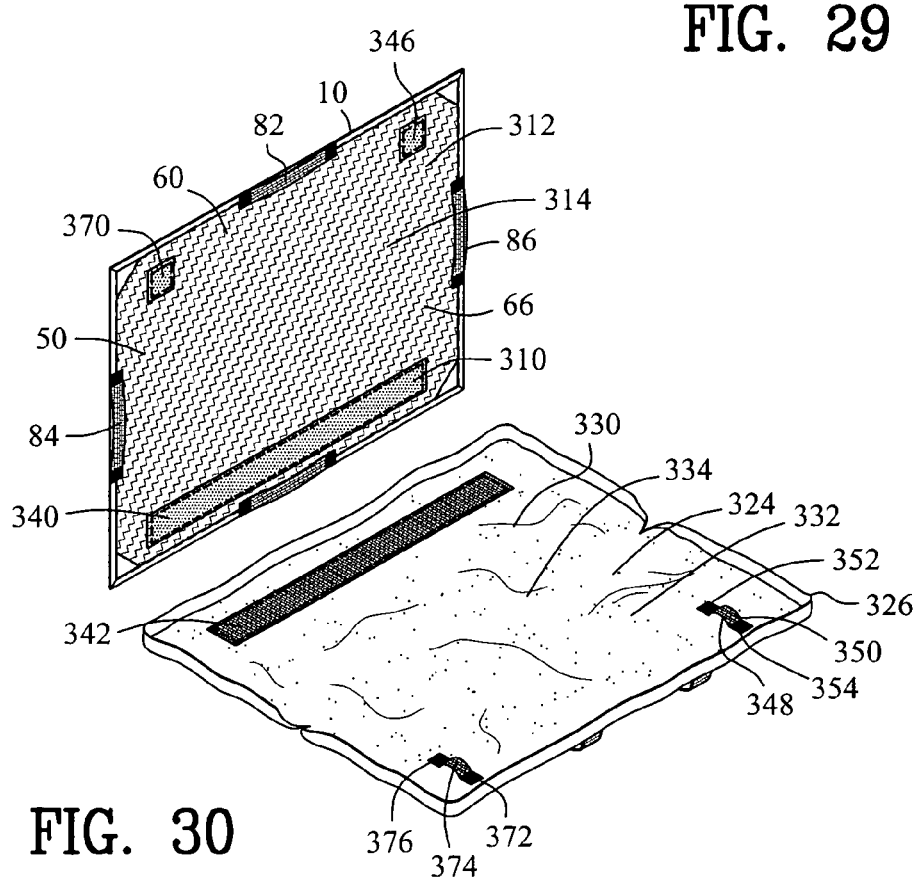
FIG. 30 is a view similar to FIG. 29 illustrating the electrical pedal mat being removed from the flexible case for exposing a flexible coupling device.

As seen in FIGS. 3, 4, 15, 16, 18 and 23, the flexible sheet 30 may including a first sheet handle 80, a second sheet handle 82, a third sheet handle 84 and a fourth sheet handle 86 secured adjacent to the outer edge 54 of the lower flexible sheet 34. The first sheet handle 80, second sheet handle 82, third sheet handle 84 and fourth sheet handle 86 allow the individual 18 to grasp the flexible sheet 30. The flexible sheet 30 may require grasping in order to displace or transport the flexible sheet 30. As shown in FIG. 23, the third sheet handle 84 and the fourth sheet handle 86 may include an off-center alignment 88 relative to the flexible sheet 30 for permitting the flexible sheet 30 to be more easily positioned into a folded position which is discuss below. The flexible sheet 30 may be constructed of a woven polymeric material or other suitable materials. The first sheet handle 80, second sheet handle 82, third sheet handle 84 and fourth sheet handle 86 may be coupled to the lower flexible sheet 34 by a plurality of stitches 46.

FIGS. 4, 5, 15, 18 and 26 illustrate the flexible sheet 30 including a sheet fold 100 for defining a crease 102 interposed between a first sheet side 104 and a second sheet side 106. The first sheet side 104 and the second sheet side 106 define a sheet channel 108 there between. The sheet channel 108 is utilized for housing and protecting the electrical pedal component 12. With the first sheet handle 80 secured to the first sheet side 104 and the second sheet handle 82 secured to the second sheet side 106, the first sheet handle 80 and the second sheet handle 82 may be placed in a consolidated position 110 while in the sheet fold 100 position. The consolidated position 110 permits the individual 18 to grasp the first sheet handle 80 and the second sheet handle 82 simultaneously with only one hand 24. The consolidated position 110 facilitates the transportation of the flexible sheet 30 while in the sheet fold 100 position.

Figure 5:
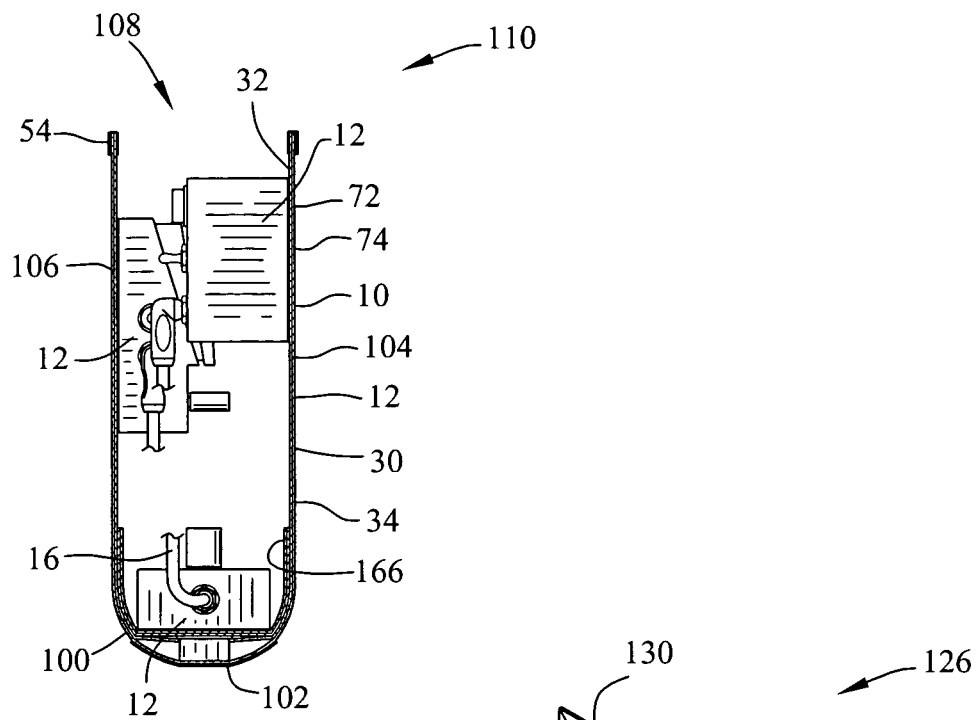
FIG. 5 is a sectional view along line 5-5 in FIG. 4.
Figure 6:
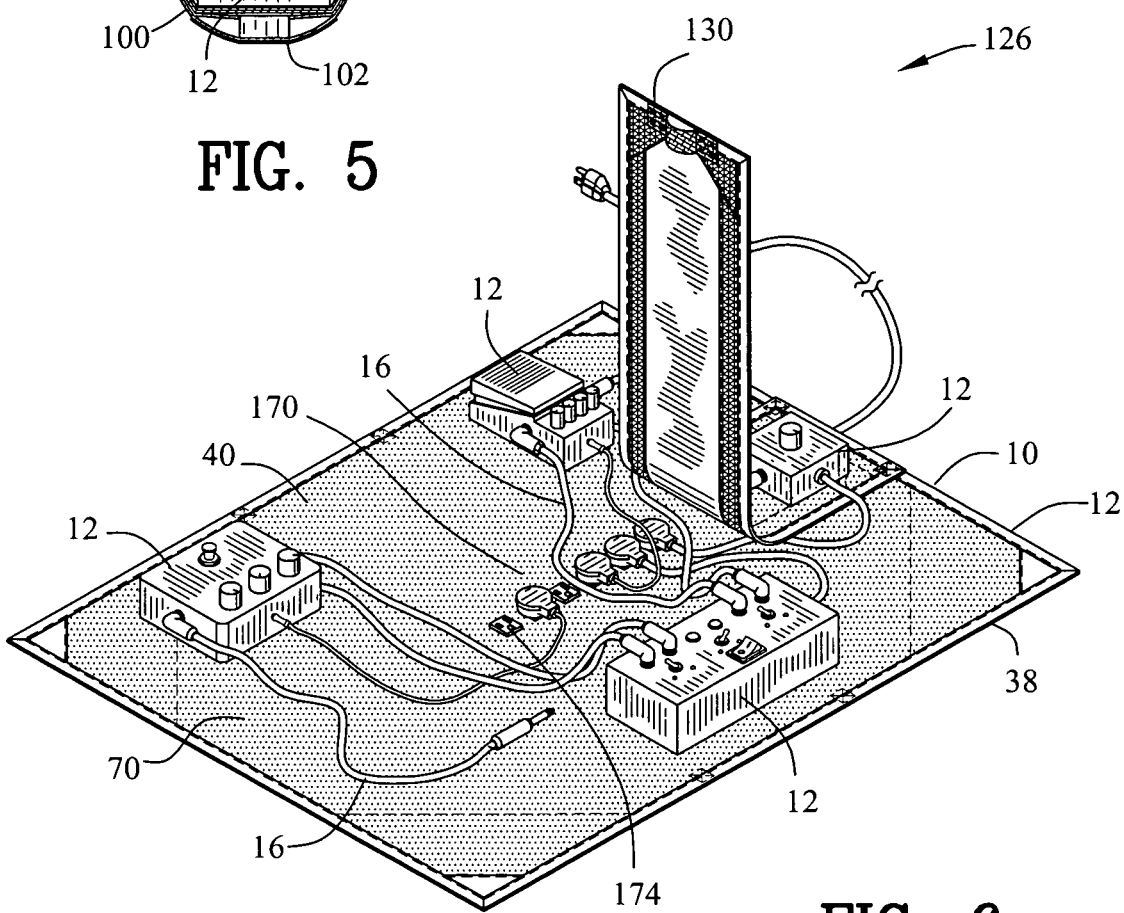
FIG. 6 is an enlarged view of a portion of FIG. 1 illustrating a flexible cap sheet being partially removed from the electrical pedal mat.
Figures 7, 8:
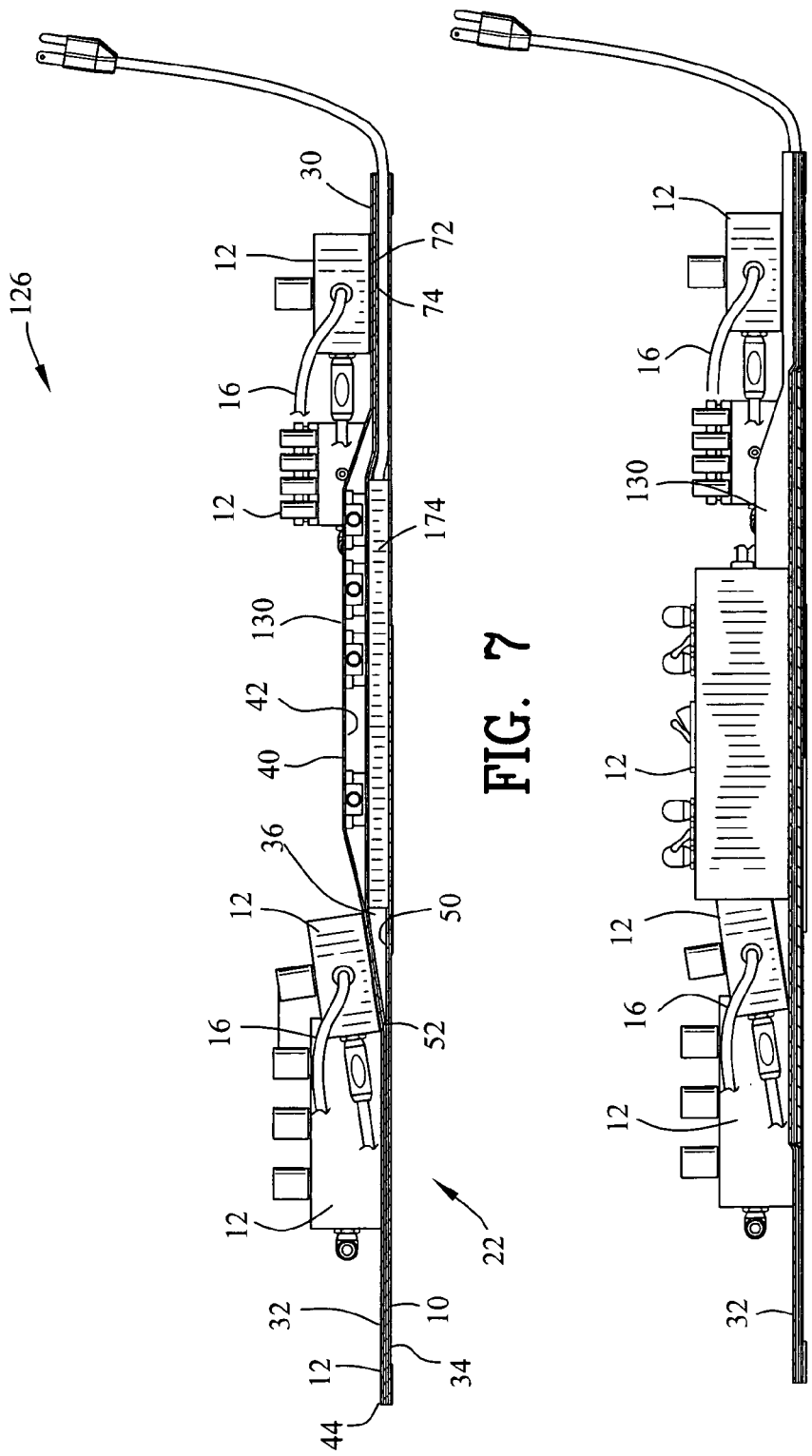
FIG. 7 is a sectional view along line 7-7 in FIG. 2.
FIG. 8 is a sectional view along line 8-8 in FIG. 2.
Figure 9:
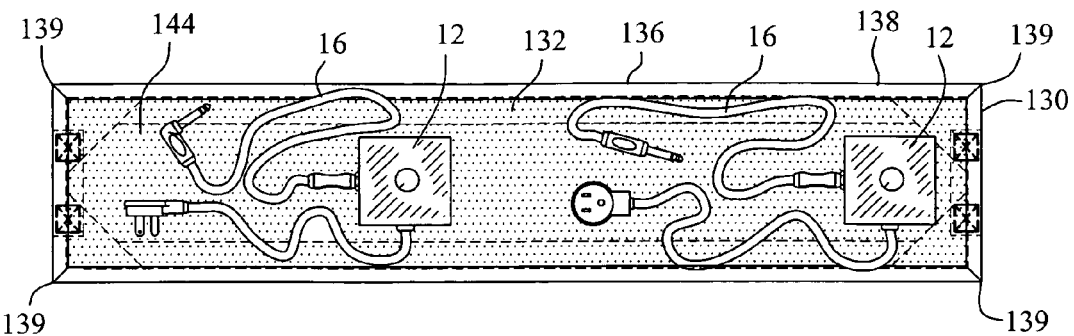
FIG. 9 is a top view of the flexible cap sheet of FIG. 2 illustrating the flexible cap sheet and electrical pedal component being utilized independently from the electrical pedal mat.
Figure 17:
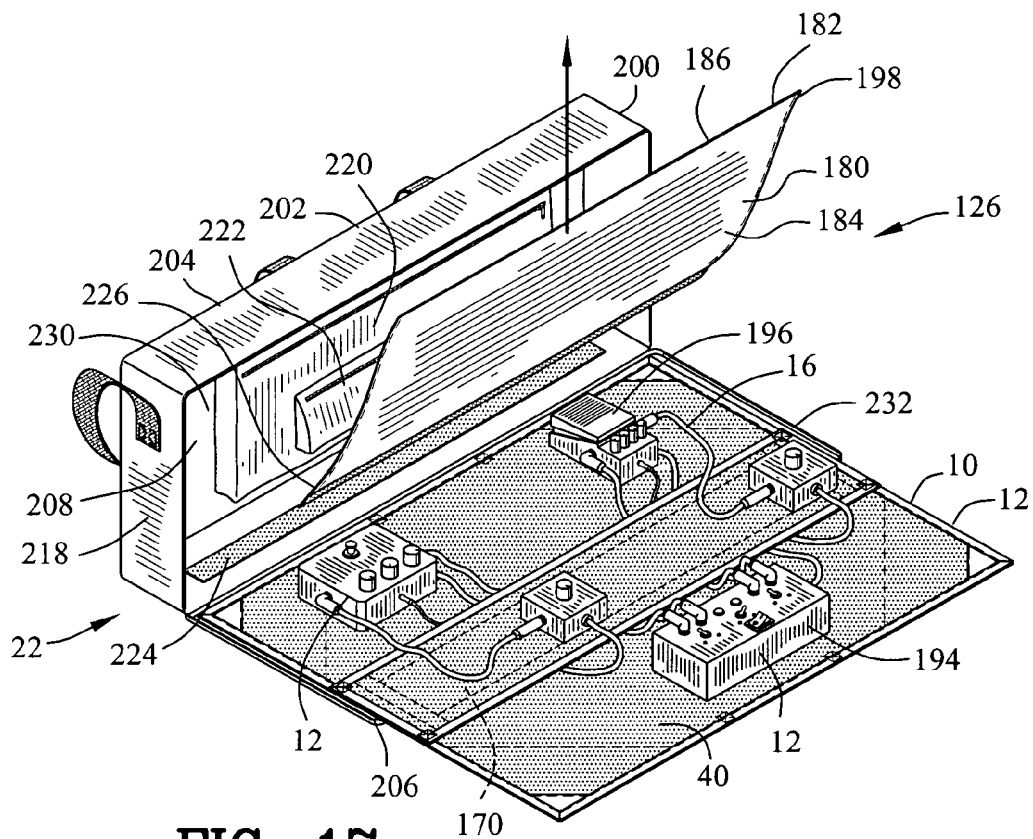
FIG. 17 is a view similar to FIG. 16 illustrating the insert panel being removed from the base of the case.
Figure 18:
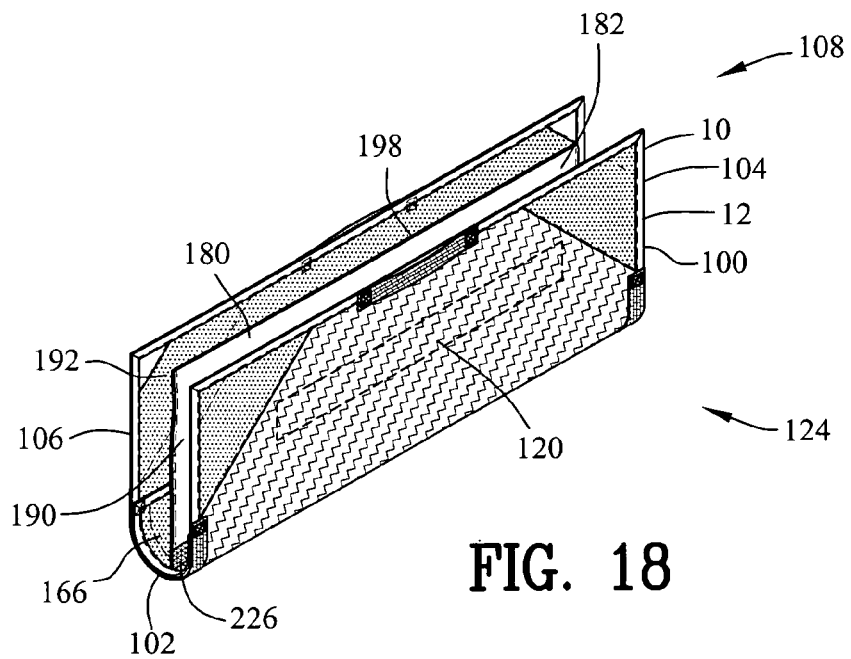
FIG. 18 is a view similar to FIG. 4 illustrating the insert panel being inserted into the cap fold of the electrical pedal mat.

As best seen in FIGS. 3, 4 and 18, the flexible sheet 30 may include a first reinforcing rib 120 and a second reinforcing rib 122. The first reinforcing rib 120 is secured within the flexible sheet chamber 36 of the first sheet side 104 for stiffening the first sheet side 104 of the flexible sheet 30. Similarly, the second reinforcing rib 122 is secured within the flexible sheet chamber 36 of the second sheet side 106 for stiffening the second sheet side 106 of the flexible sheet 30. Preferably, the first reinforcing rib 120 and the second reinforcing rib 122 has a parallel orientation 124 with the sheet fold 100. The parallel orientation 124 permits the flexible sheet 30 to position from a linear position 126 as shown in FIGS. 1-3, 6-8, 16, 17, 21 and 22 to the sheet fold 100 position as shown in FIGS. 4, 5 and 15 for defining the crease 102 in the flexible sheet 30. The first reinforcing rib 120 and the second reinforcing rib 122 as shown in FIGS. 3, 4 and 18 are to be permanently installed into the flexible sheet 30 by inserting the first reinforcing rib 120 and the second reinforcing rib 122 within the flexible sheet chamber 36 and thereafter a plurality of stitches 46 traverse between the upper flexible sheet 32 and the lower flexible sheet 34 to encase the first reinforcing rib 120 and the second reinforcing rib 122. Preferably, the first reinforcing rib 120 and the second reinforcing rib 122 that are permanent have a width between six and seven inches.

FIGS. 23-26 illustrate the first reinforcing rib 120 and the second reinforcing rib 122 being removable from the flexible sheet 30. More specifically, the flexible sheet 30 includes a first rib pocket 112 and a second rib pocket 114 constructed by a plurality of stitches 46 traversing between the upper flexible sheet 32 and the lower flexible sheet 34. The lower flexible sheet 34 includes a first slot 116 and a second slot 118 that are positioned adjacent to the first rib pocket 112 and the second rib pocket 114, respectively. The first reinforcing rib 120 and the second reinforcing rib 122 are inserted into the first rib pocket 112 and the second rib pocket 114 through the first slot 116 and the second slot 118 respectively. Preferably, the first reinforcing rib 120 and the second reinforcing rib 122 that are removable have a width between three and four inches. The first reinforcing ribs 120 and the second reinforcing rib 122 may be removed from the flexible sheet 30 in order for a crease 102 to be positioned at multiple locations and angles to the flexible sheet 30.

FIGS. 1-12, 15-18, 20, 22 and 26, illustrate a flexible cap sheet 130 defining a top cap surface 132, a bottom cap surface 134 and an outer cap edge 136. The flexible cap sheet 130 may be constructed of a woven polymeric material or other suitable materials. The flexible cap sheet 130 is shown as a rectangle 138 including four right angles 139 however the flexible cap sheet 130 may also include various other geometric shapes such as a square or circle.

Figure 10:
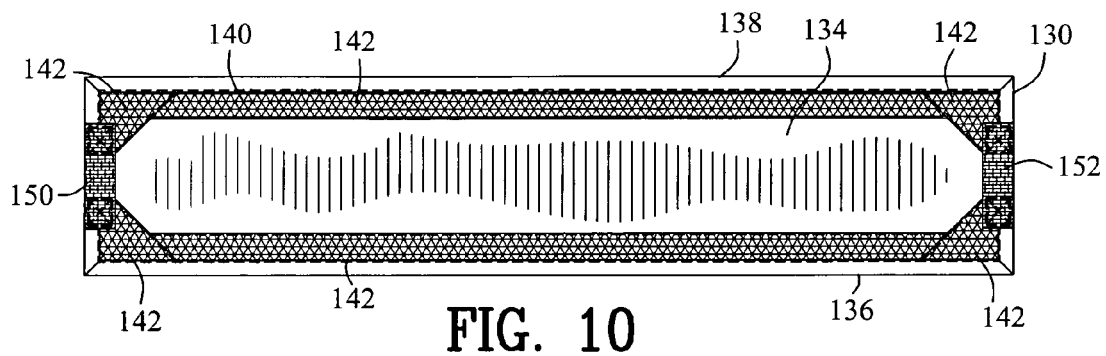
FIG. 10 is a bottom view of FIG. 9.
Figure 11:
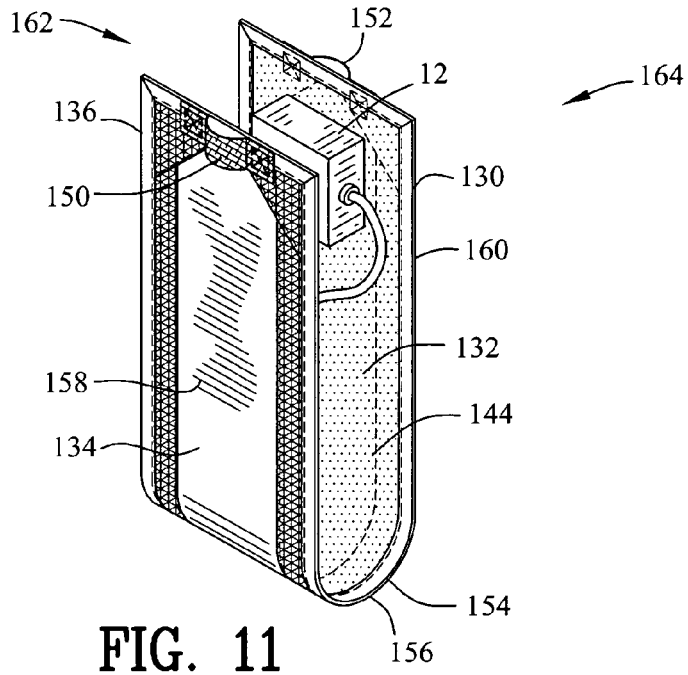
FIG. 11 is a front isometric view of the flexible cap sheet in FIG. 9 including a cap fold for defining a cap crease interposed between a first cap side and a second cap side for housing and protecting the electrical pedal component.

A bottom cap hook and loop layer 140 is coupled to the bottom cap surface 134 of the flexible cap sheet 130. As shown in FIGS. 10 and 11, the bottom cap hook and loop layer 140 may include a plurality of hook and loop strips 142 positioned adjacent to the outer cap edge 136 of the bottom cap surface 134. The bottom cap hook and loop layer 140 may be secured to the flexible cap sheet 130 by a plurality of stitches 46. The bottom cap hook and loop layer 140 interlocks with the top hook and loop layer 70 of the upper flexible sheet 32 for coupling the flexible cap sheet 130 to the flexible sheet 30. Since the bottom cap hook and loop layer 140 extends adjacent to the outer cap edge 136, one or more of the flexible cap sheet 130 may be positioned in multiple configurations and locations on the upper flexible sheet 32. Furthermore, the removable coupling between the top hook and loop layer 70 and the bottom cap hook and loop layer 140 permits one or more flexible cap sheet 130 to be removed from the electrical pedal mat 10 and replaced with another flexible cap sheet 130.

A top cap hook and loop layer 144 is coupling to the top cap surface 132 of the flexible cap sheet 130. The top cap hook and loop layer 144 may be secured to the top cap surface 132 of the top cap surface 132 by a plurality of stitches 46. As discussed above, the object or pedal hook and loop layer 72 is coupled to the electrical pedal component 12. The pedal hook and loop layer 72 has an adhesive backing 74 that secures the pedal hook and loop layer 72 to the electrical pedal component 12. The top cap hook and loop layer 144 and the pedal hook and loop layer 72 interlock for coupling the electrical pedal component 12 to the flexible cap sheet 130. Since the top cap hook and loop layer 144 extends over the entire surface of the top cap surface 132, one or more of the electrical panel component 12 may be positioned in multiple configurations and locations on the top cap surface 132. Furthermore, the removable coupling between the top cap hook and loop layer 144 and the pedal hook and loop layer 72 permits one or more electrical panel component 12 to be removed from the electrical pedal mat 10 and replaced with another electrical panel component 12.

As seen in FIGS. 6, 9-12 and 22, the flexible cap sheet 130 may including a first cap handle 150 and a second cap handle 152 secured adjacent to the outer cap edge 136 of the bottom cap surface 134. The first cap handle 150 and the second cap handle 152 allow the individual 18 to grasp the flexible cap sheet 130. The flexible cap sheet 130 may require grasping in order to displace or transport the flexible cap sheet 130. The flexible cap sheet 130 may be constructed of a woven polymeric material or other suitable materials. The first cap handle 150 and the second cap handle 152 may be coupled to the lower bottom cap surface 134 by a plurality of stitches 46.

FIGS. 6, 9-12 and 22 illustrate the flexible cap sheet 130 including a cap fold 154 for defining a cap crease 156 interposed between a first cap side 158 and a second cap side 160. The first cap side 158 and the second cap side 160 define a cap channel 162 there between. The cap channel 162 is utilized for housing and protecting the electrical pedal component 12. With the first cap handle 150 secured to the first cap side 158 and the second cap handle 152 secured to the second cap side 160, the first cap handle 150 and the second cap handle 152 may be placed in a cap consolidated position 164 while in the cap fold 154 position. The cap consolidated position 164 permits the individual 18 to grasp the first cap handle 150 and the second cap handle 152 simultaneously with only one hand 24. The cap consolidated position 164 facilitates the transportation of the flexible cap sheet 130 while in the cap fold 154 position. As seen in FIGS. 4, 5, 15, 18 and 26, the flexible cap sheet 130 may have a second cap crease 166 wherein the flexible cap sheet 130 is positioned adjacent to the crease 102 of the flexible sheet 30.

As best seen in FIGS. 2, 6, 16 and 17, the bottom cap hook and loop layer 140 of the flexible cap sheet 130 interlocking with the top hook and loop layer 70 of the upper flexible sheet 32 define an electrical conduit chamber 170 there between. The electrical conduit chamber 170 receiving the electrical conduit 16 for housing and protecting the electrical conduit 170. Furthermore, by placing the electrical conduit 16 within the electrical conduit chamber 170 the foot 20 of the individual 18 is less likely to make contact.

The upper flexible sheet 32 of the flexible sheet 30 may also include a plurality of apertures 172 for transitioning the electrical conduit 170 through the upper flexible sheet and the flexible sheet chamber. In addition, the flexible sheet 30 may further include an electrical power strip 174 positioned within the flexible sheet chamber 36. The top surface 40 of the upper flexible sheet 32 include an elongated aperture 176 above the electrical power strip 174 for accessing the electrical power strip 174.

As shown in FIG. 18, an insert panel 180 may be positioned within the sheet channel 108. The insert panel 180 defines a first panel surface 182, a second panel surface 184 and an outer edge 186. The positioning of the insert panel 180 within the sheet channel 108 divides the sheet channel 108 into a first insert channel 190 between the first sheet side 104 and the first panel surface 182 of the insert panel 180 and a second insert channel 192 between the second sheet side 106 and the second panel surface 184 of the insert panel 180. The first insert channel 190 and the second insert channel 192 house and protect the one or more electrical pedal components 12. More specifically, the insert panel 180 prevents contact between a first electrical pedal component 194 interlocking with the first side sheet 104 and a second electrical pedal component 196 interlocking with the second side sheet 106. The insert panel 180 may further include an interior cushioning layer 198 for dampening an impact between the first electrical pedal component 194 and the second electrical pedal component 196.

As shown in FIGS. 13-20 the invention also incorporates a carrier 200 for transporting the electrical pedal mat 10. The carrier comprises a case 202 having a body 204 and a closure wall 206 pivotably mounted to the body 204. The body 204 defining a case chamber 208 for receiving the flexible sheet 30. The body further includes a bottom spine 216 for resting the case 202 in a vertical position. The case 202 may further include a shoulder strap 210 and a first hand strap 212 and a second hand strap 214 for facilitating the lifting and carrying of the case 202. The first hand strap 212 and a second hand strap 214 may be coupled together by a hook and loop handle union 215. The exterior side of the bottom spine 216 may have a plurality of polymeric pads 219 for increasing the coefficient of friction between the surface 22 and the bottom spine 216. The case chamber 208 may include a first sealable pocket 220 and a second sealable pocket 222 for storing miscellaneous items.

The interior side of the bottom spine 216 may include a case hook and loop strip 224 that is pivotally secured within the body 204. The insert panel 180 includes a panel hook and loop strip 226 adjacent to the outer edge 186. The case hook and loop strip 224 and the panel hook and loop strip 226 interlock for pivotally coupling the insert panel 180 to the body 204. The insert panel 180 divides the case chamber 208 into a first case chamber 230 and a second case chamber 232. The flexible sheet 30 is positioned within the carrier 200 such that the first sheet side 104 is positioned within the first case chamber 230, the second sheet side 106 is positioned within the second case chamber 232 and the insert panel 180 is positioned within the sheet channel 108. The first case chamber 230 and the second case chamber 232 house and protect the one or more electrical pedal components 12 interlocked to the flexible sheet 30, and in addition the insert panel 180 prevents contact between a first electrical pedal component 194 interlocking with the first side sheet 104 and a second electrical pedal component 196 interlocking with the second side sheet 106.

FIGS. 15-18 illustrate the steps that may be taken to remove the flexible sheet 30 from the case 202. In FIG. 15, the case 202 is positioned on the surface 22 such that the closure wall 206 is supported by the surface 22. Since a plurality of sidewalls 218 are exclusively located on the body 204 and not the closure wall 206, flexible sheet 30 is more efficiently removed by sliding the flexible sheet 30 off the closure wall 206. The individual may utilize the first sheet handle 80 for pivoting the flexible sheet 30 from the sheet fold 100 position to the linear position 126 as shown in FIGS. 15 and 16. Thereafter, the flexible sheet 30 may be slid off the closure wall 206 by utilizing the first sheet handle 80 as shown in FIG. 16. The insert panel 180 may then be removed from the body 204 by this engaging panel hook and loop strip 226 from the case hook and loop strip 224 as shown in FIG. 17. Finally, the insert panel 180 may be positioned within the sheet channel 108. During the consolidated position 110 of the flexible sheet 30, the insert panel 180 prevents contact between a first electrical pedal component 194 interlocking with the first side sheet 104 and a second electrical pedal component 196 interlocking with the second side sheet 106. The consolidated position 110 permits the individual 18 to grasp the first sheet handle 80 and the second sheet handle 82 simultaneously with only one hand 24. The consolidated position 110 facilitates the transportation of the flexible sheet 30 while in the sheet fold 100 position without damaging one or more of the electrical pedal components 194 and 196.

Figure 19:
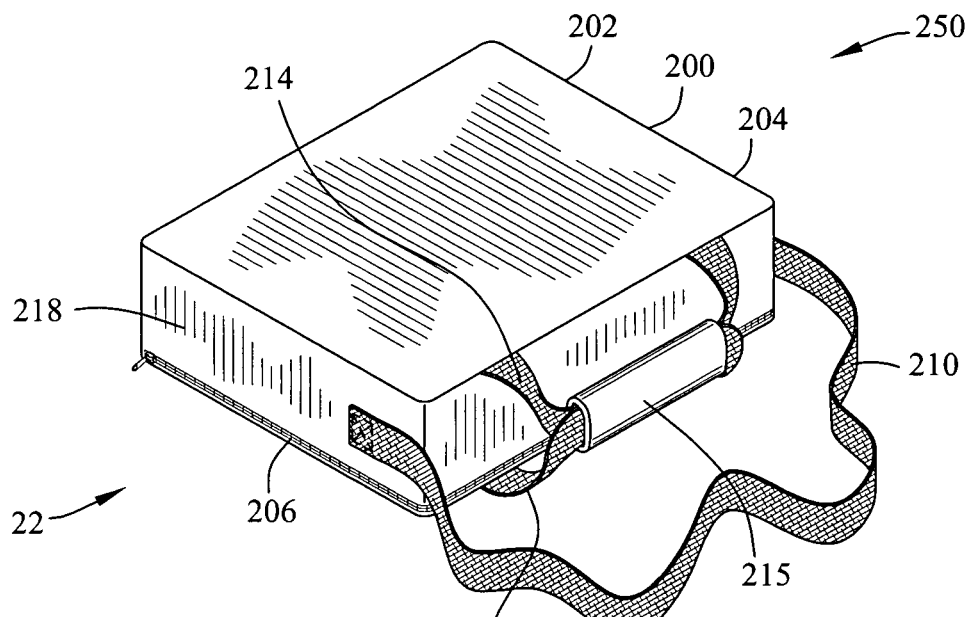
FIG. 19 is a front isometric view of a second case having a body and a closure wall for receiving the electrical pedal mat.
Figure 20:
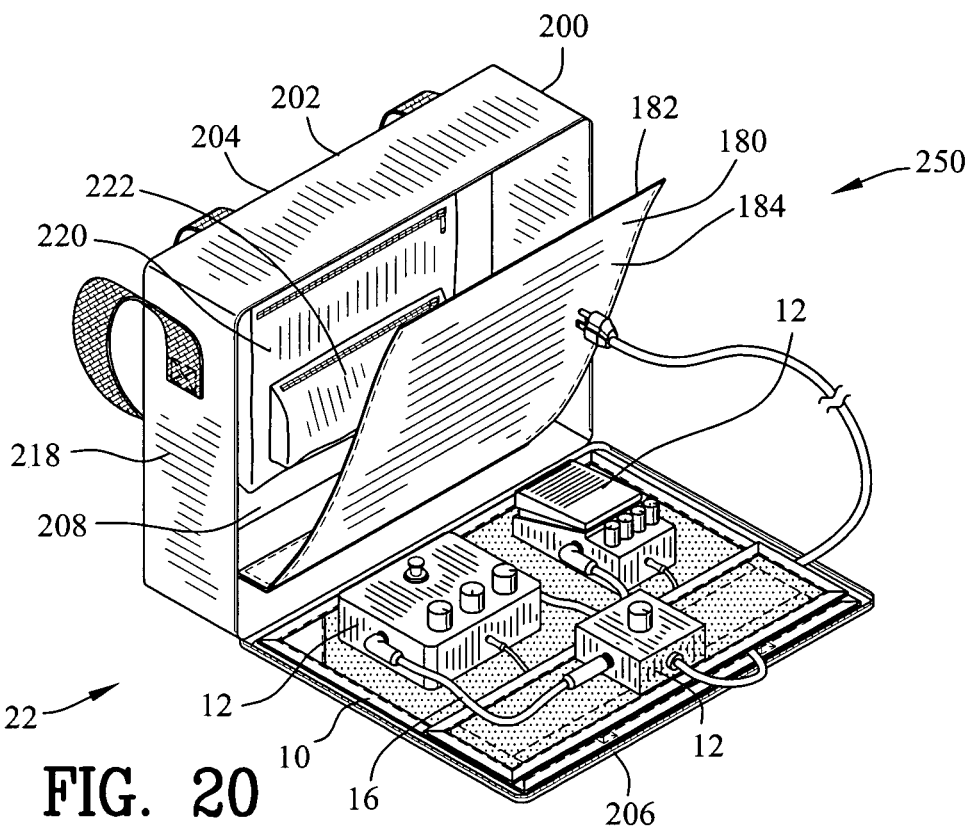
FIG. 20 is a view similar to FIG. 16 illustrating a second embodiment of an electrical pedal mat.
Figure 21:
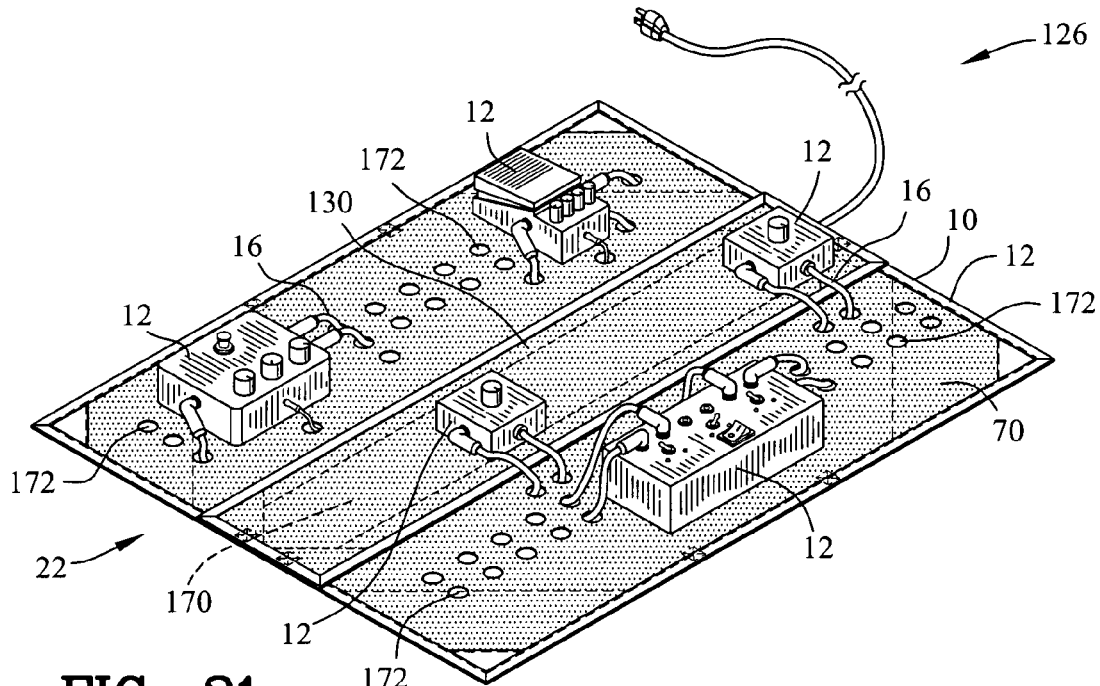
FIG. 21 is a front isometric view of a second embodiment of the electrical pedal mat having a plurality of apertures for transitioning an electrical conduit through the electrical pedal mat.
Figure 22:
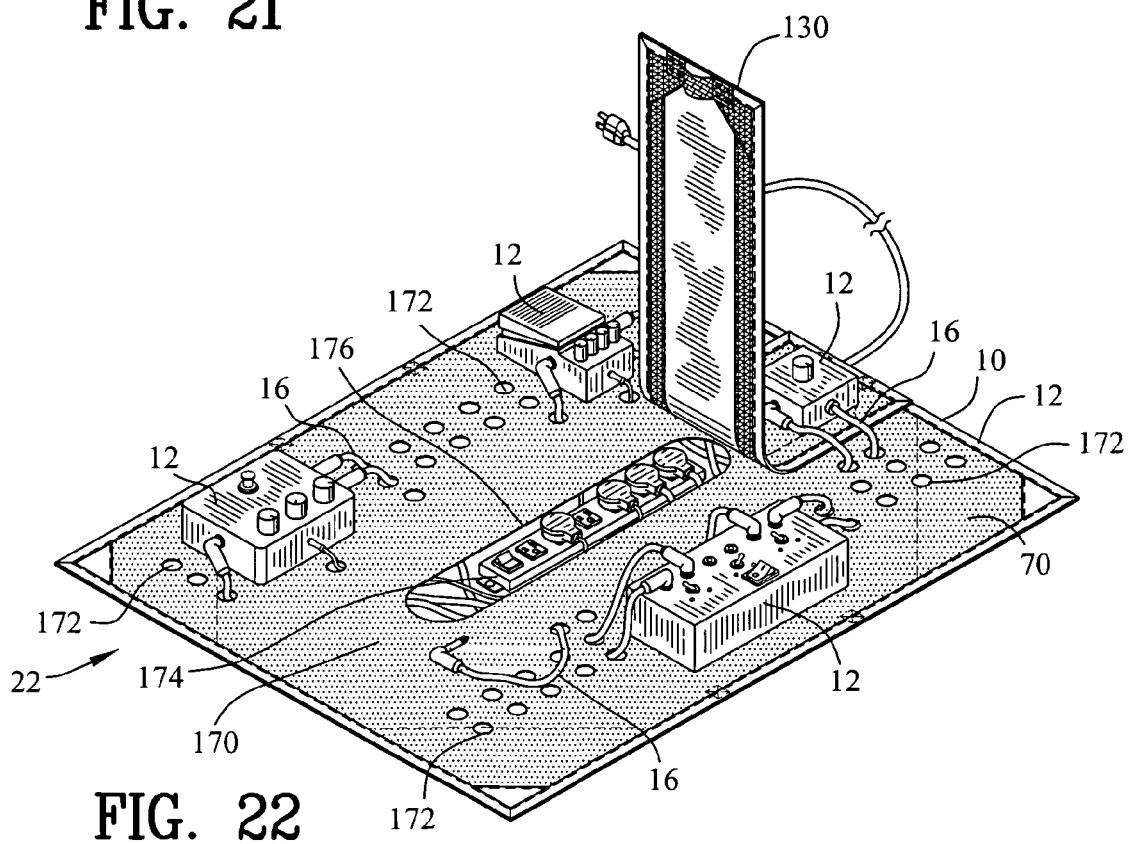
FIG. 22 is a view similar to FIG. 21 illustrating the flexible cap sheet being partially removed from the electrical pedal mat.

FIGS. 19 and 20 illustrate a second embodiment 250 of the carrier 200 and flexible sheet 30. In the second embodiment 250, the carrier 200 and the flexible sheet 30 are structurally equivalent to the first embodiment. However, the dimensions of the second embodiment 250, as shown in FIGS. 19 and 20 are such that the flexible sheet 30 is not intended to be placed in a sheet fold 100 position.

FIGS. 27-32 illustrate a third embodiment 300 wherein a receptacle 302 receives the object 12. The surface 22 supports the receptacle 300. The receptacle 300 comprises a flexible sheet 30 defining a top surface 40, a bottom surface 52 and an outer edge 54. The flexible sheet 30 has a first sheet half 310 and a second sheet half 312 coupled by a crease area 314. A top hook and loop layer 70 is coupled to the top surface 40 of the flexible sheet 30. The object hook and loop layer 72 is coupled to the object 12. The top hook and loop layer 70 and the object hook and loop layer 72 interlock for coupling the object 12 to the flexible sheet 30.

A carrier 320 defines an exterior surface 322, an interior surface 324 and an outer rim 326. The carrier 320 has a first carrier panel 330 and a second carrier panel 332 coupled by a carrier spine 334. A first sheet hook and loop layer 340 is coupled to the bottom surface 52 and the first sheet half 310 of the flexible sheet 30. A carrier hook and loop layer 342 is coupled to the interior surface 324 and the first carrier panel 330 of the carrier 320. The first sheet hook and loop layer 340 is removably coupling with the carrier hook and loop layer 342 for defining a static attachment 344 between the flexible sheet 30 and the carrier 320. A second sheet hook and loop layer 346 is coupling to the bottom surface 52 and the second sheet half 312 of the flexible sheet 30.

A band hook and loop 348 is coupled to the interior surface 324 and the second carrier panel 332 of the carrier 320. The band hook and loop 348 defines a flexible hook and loop belt 350 positioned between a first mounting end 352 and a second mounting end 354. The first mounting end 352 and the second mounting end 354 are coupled to the interior surface 324 and the second carrier panel 332 of the carrier 320 for defining a bulbous loop 356 in the flexible hook and loop belt 350 that is distanced from the interior surface 324. The second sheet hook and loop layer 346 is removably coupled with the flexible hook and loop belt 350 for defining a dynamic attachment 358 between the flexible sheet 30 and the carrier 320.

The flexible sheet 30 and the carrier 320 fold upon the crease area 314 and the carrier spine 334 respectively for positioning the first sheet half 310 adjacent to the second sheet half 312 of the flexible sheet 30 and the first carrier panel 330 adjacent to the second carrier panel 332 of the carrier 320 for defining a fold position 360. The first sheet half 310, the second sheet half 312 and the crease area 314 of the flexible sheet 30 align and the first carrier panel 330, the second carrier panel 332 and the carrier spine 334 of the carrier 320 align for defining an utility position 362 wherein the surface 22 supports the carrier 320. The bulbous loop 356 has a first yieldable position 364 during the carrier 320 and the flexible sheet 30 in the folded position 360. The bulbous loop 356 has a second yieldable position 366 during the carrier 320 and the flexible sheet 30 in the utility position 362. The dynamic attachment 358 permits the independent displacement of the flexible sheet 30 relative to the carrier 320 during transitioning between the folding position 360 and the utility position 362.

A receptacle for receiving an object as set forth in claim 21, further including a gripper layer coupling to the bottom surface of the flexible sheet 30 for resisting displacement of the flexible sheet 30 relative to the surface 22 after removing the flexible sheet 30 from the carrier 320 and positioning the flexible sheet 30 on the surface 22.

The third embodiment 300 may further include a third sheet hook and loop layer 370 coupling to the bottom surface 52 and the second sheet half 312 of the flexible sheet 30. A second band hook and loop 372 is coupled to the interior surface 324 and the second carrier panel 332 of the carrier 320. The second band hook and loop 372 defines a second flexible hook and loop belt 374 positioning between a first mounting end 352 and a second mounting end 354. The first mounting end 352 and the second mounting end 354 of the second band hook and loop 372 couples to the interior surface 324 and the second carrier panel 332 of the carrier 320 for defining a second bulbous loop 376 in the second flexible hook and loop belt 374 that is distanced from the interior surface 324. The third sheet hook and loop layer 370 is removably coupled with the second flexible hook and loop belt 374 for defining a second dynamic attachment 378 between the flexible sheet 30 and the carrier 320.

The receptacle 300 may further include a zipper 390 having a first spine zipper portion 392 in the carrier spine 334, an outer rim zipper portion 394 in the outer rim 326 and a second spine zipper portion 396 in the carrier spine 334. The first spine zipper portion 392 and the second spine zipper portion 396 permit the first carrier panel 330, the carrier spine 334 and the second carrier panel 332 to continuously abut the surface 22 for defining a continuous linear mat 398.

As best shown in FIG. 31, the flexible sheet 30 includes a sheet fold 400 for defining a crease 402 interposed between the first sheet half 310 and the second sheet half 312. The first sheet half 310 and the second sheet half 312 define a sheet channel 404 for housing and protecting the object 12. The insert panel 180 defines a first panel surface 182, a second panel surface 184 and an outer edge 186. The insert panel 180 is positioned within the sheet channel 404 for defining a first insert channel 190 between the first sheet half 310 and the first panel surface 182 of the insert panel 180 and a second insert channel 192 between the second sheet half 312 and the second panel surface 184 of the insert panel 180. The first insert channel 190 and the second insert channel 192 housing and protecting the object 12.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A mat for engaging an object, a surface supporting the mat, the mat, comprising:
   a flexible sheet defining a top surface, a bottom surface and an outer edge;
   a gripper layer coupling to said bottom surface for resisting displacement of said flexible sheet relative to the surface;
   a top hook and loop layer coupling to said top surface of said flexible sheet;
   an object hook and loop layer coupling to the object;
   said top hook and loop layer and said object hook and loop layer interlocking for coupling the object to said flexible sheet;
   said flexible sheet including a sheet fold for defining a crease interposed between a first sheet side and a second sheet side;
   said first sheet side and said second sheet side defining a sheet channel for housing and protecting the object;
   first reinforcing rib securing to said first sheet side for stiffening said first sheet side of said flexible sheet;
   a second reinforcing rib securing to said second sheet side for stiffening said second sheet side of said flexible sheet; and
   said first reinforcing rib and said second reinforcing rib having a parallel orientation with said sheet fold for permitting said crease in said flexible sheet.

2. A mat for engaging an object as set forth in claim 1, wherein said gripper layer including a bottom hook and loop layer and a bottom polymeric layer for resisting displacement of said flexible sheet relative to the surface.

3. A mat for engaging an object as set forth in claim 1, wherein said flexible sheet including a first sheet handle and a second sheet handle for grasping said flexible sheet.

4. A mat for engaging an object as set forth in claim 1, wherein said flexible sheet including a sheet fold for defining a crease interposed between a first sheet side and a second sheet side;
   said first sheet side and said second sheet side defining a sheet channel for housing and protecting the object;
   a first sheet handle secured to said first sheet side;
   a second sheet handle secured to said second sheet side; and
   said first sheet handle and said second sheet handle positioned adjacent to said outer edge on said flexible sheet for grasping said flexible sheet when said flexible sheet having said sheet fold.

5. A mat for engaging an object as set forth in claim 1, wherein said flexible sheet including a sheet fold for defining a crease interposed between a first sheet side and a second sheet side;
   said first sheet side and said second sheet side defining a sheet channel for housing and protecting the object;
   an insert panel defining a first panel surface, a second panel surface and an outer edge;
   said insert panel positioning within said sheet channel for defining a first insert channel between said first sheet side and said first panel surface of said insert panel and a second insert channel between said second sheet side and said second panel surface of said insert panel; and
   said first insert channel and said second insert channel housing and protecting the object.

6. A mat for engaging an object as set forth in claim 1, further including a flexible cap sheet defining a top cap surface, a bottom cap surface and an outer cap edge;
   a bottom cap hook and loop layer coupling to said bottom cap surface for interlocking with said top hook and loop layer of said flexible sheet for coupling said flexible cap sheet to said flexible sheet;
   a top cap hook and loop layer coupling to said top cap surface of said flexible cap sheet;
   an object cap hook and loop layer coupling to the object; and
   said top cap hook and loop layer and said object cap hook and loop layer interlocking for coupling the object to said flexible cap sheet.

7. A mat for engaging an object as set forth in claim 1, further including a flexible cap sheet defining a top cap surface, a bottom cap surface and an outer cap edge;
   a bottom cap hook and loop layer coupling to said bottom cap surface for interlocking with said top hook and loop layer of said flexible sheet for coupling said flexible cap sheet to said flexible sheet;
   a top cap hook and loop layer coupling to said top cap surface of said flexible cap sheet;
   said top cap hook and loop layer and said object hook and loop layer interlocking for coupling the object to said flexible cap sheet;
   said flexible cap sheet including a cap fold for defining a cap crease interposed between a first cap side and a second cap side;
   said first cap side and said second cap side defining a cap channel for housing and protecting the object;
   a first cap handle secured to said first cap side;
   a second cap handle secured to said second cap side; and
   said first cap handle and said second cap handle positioned adjacent to said outer edge on said flexible cap sheet for grasping said flexible cap sheet when said flexible cap sheet having said cap fold.

8. An electrical pedal mat for engaging an electrical pedal component, the electrical pedal component electrically coupled to a musical instrument by an electrical conduit, a surface supporting the electrical pedal mat, the electrical pedal mat, comprising:
   a flexible sheet defining an upper flexible sheet and a lower flexible sheet;
   said upper flexible sheet having a top surface, a bottom surface and an outer edge;
   said lower flexible sheet having a top surface, a bottom surface and an outer edge;
   said upper flexible sheet coupling to said lower flexible sheet with said bottom surface of said upper flexible sheet positioned adjacent to said top surface of said lower flexible sheet for defining a flexible sheet chamber there between;
   a gripper layer coupling to said bottom surface of said lower flexible sheet for resisting displacement of said lower flexible sheet relative to the surface;
   a top hook and loop layer coupling to said top surface of said upper flexible sheet;
   a pedal book and loop layer coupling to the electrical pedal component; and
   said top hook and loop layer and said pedal hook and loop layer interlocking for coupling the electrical pedal component to said upper flexible sheet.

9. An electrical pedal mat for engaging an electrical pedal component as set forth in claim 8, wherein said gripper layer including a bottom hook and loop layer and a polymeric layer for resisting displacement of said lower flexible sheet relative to the surface.

10. An electrical pedal mat for engaging an electrical pedal component as set forth in claim 8, wherein said flexible sheet including a first sheet handle and a second sheet handle for grasping said flexible sheet.

11. An electrical pedal mat for engaging an electrical pedal component as set forth in claim 8, wherein said flexible sheet including a sheet fold for defining a crease interposed between a first sheet side and a second sheet side;
  said first sheet side and said second sheet side defining a sheet channel for housing and protecting the electrical pedal component;
  a first sheet handle secured to said first sheet side,
  a second sheet handle secured to said second sheet side; and
  said first sheet handle and said second sheet handle positioned adjacent to said outer edge on said flexible sheet for grasping said flexible sheet when said flexible sheet having said sheet fold.

12. An electrical pedal mat for engaging an electrical pedal component as set forth in claim 8, wherein said flexible sheet including a sheet fold for defining a crease interposed between a first sheet side and a second sheet side;
  said first sheet side and said second sheet side defining a sheet channel for housing and protecting the electrical pedal component;
  a first reinforcing rib secured within said flexible sheet chamber of said first sheet side for stiffening said first sheet side of said flexible sheet;
  a second reinforcing rib secured within said flexible sheet chamber of said second sheet side for stiffening said second sheet side of said flexible sheet; and
  said first reinforcing rib and said second reinforcing rib having a parallel orientation with said sheet fold for permitting said crease in said flexible sheet.

13. An electrical pedal mat for engaging an electrical pedal component as set forth in claim 8, wherein said flexible sheet including a sheet fold for defining a crease interposed between a first sheet side and a second sheet side;
  said first sheet side and said second sheet side defining a sheet channel for housing and protecting the electrical pedal component;
  an insert panel defining a first panel surface, a second panel surface and an outer edge;
  said insert panel positioning within said sheet channel for defining, a first insert channel between said first sheet side and said first panel surface of said insert panel and a second insert channel between said second sheet side and said second panel surface of said insert panel; and
  said first insert channel and said second insert channel housing and protecting the electrical pedal component.

14. An electrical pedal mat for engaging an electrical pedal component as set forth in claim 8, further including a flexible cap sheet defining a top cap surface, a bottom cap surface and an outer cap edge;
  a bottom cap hook and loop layer coupling to said bottom cap surface for interlocking with said top hook and loop layer of said upper flexible sheet for coupling said flexible cap sheet to said flexible sheet;
  a top cap hook and loop layer coupling to said top cap surface of said flexible cap sheet;
  an pedal cap hook and loop layer coupling to the electrical pedal component; and
  said top cap hook and loop layer and said pedal cap hook and loop layer interlocking for coupling the electrical pedal component to said flexible cap sheet.

15. An electrical pedal mat for engaging an electrical pedal component as set forth in claim 8, further including a flexible cap sheet defining a top cap surface, a bottom cap surface and an outer cap edge;
  a bottom cap hook and loop layer coupling to said bottom cap surface for interlocking with said top hook and loop layer of said upper flexible sheet for coupling said flexible cap sheet to said flexible sheet;
  a top cap hook and loop layer coupling to said top cap surface of said flexible cap sheet;
  an pedal cap hook and loop layer coupling to the electrical pedal component;
  said top cap hook and loop layer and said pedal cap hook and loop layer interlocking for coupling the electrical pedal component to said flexible cap sheet;
  said flexible cap sheet including a cap fold for defining a cap crease interposed between a first cap side and a second cap side;
  said first cap side and said second cap side defining a cap channel for housing and protecting the electrical pedal component;
  a first cap handle secured to said first cap side;
  a second cap handle secured to said second cap side; and
  said first cap handle and said second cap handle positioned adjacent to said outer edge on said flexible cap sheet for grasping said flexible cap sheet when said flexible cap sheet having said cap fold.

16. An electrical pedal mat for engaging an electrical pedal component as set forth in claim 8, further including a flexible cap sheet defining a top cap surface, a bottom cap surface and an outer cap edge;
  a bottom cap hook and loop layer coupling to said bottom cap surface for interlocking with said top hook and loop layer of said upper flexible sheet for coupling said flexible cap sheet to said flexible sheet;
  said bottom cap hook and loop layer interlocking with said top hook and loop layer of said upper flexible sheet defining an electrical conduit chamber, and
  said electrical conduit chamber receiving the electrical conduit for housing and protecting the electrical conduit.

17. An electrical pedal mat for engaging an electrical pedal component as set forth in claim 8, wherein said top surface of said upper flexible sheet including a plurality of apertures for transitioning the electrical conduit through said upper flexible sheet and said flexible sheet chamber.

18. An electrical pedal mat for engaging an electrical pedal component as set forth in claim 8, further including an electrical power strip positioning within said flexible sheet chamber; and
  said top surface of said upper flexible sheet including an elongated aperture above said electrical power strip for accessing said electrical power strip.

19. A carrier and an electrical pedal mat, the carrier transporting the electrical pedal mat, the electrical pedal mat engaging an electrical pedal component, the carrier and electrical pedal mat, comprising:
  a case having a body and a closure wall pivotably mounted to said body;
  said body defining a case chamber;
  an insert panel removably secured within said case chamber;
  said insert panel defining a first case chamber and a second case chamber within said body;

a flexible sheet defining a top surface, a bottom surface and an outer edge;
a top hook and loop layer coupling to said top surface of said flexible sheet;
an pedal hook and loop layer coupling to the electrical pedal component;
said top hook and loop layer and said pedal hook and loop layer interlocking for coupling the electrical pedal component to said flexible sheet;
said flexible sheet including a sheet fold for defining a crease interposed between a first sheet side and a second sheet side;
said first sheet side and said second sheet side defining a sheet channel for housing and protecting the electrical pedal component;
said insert panel positioning within said sheet channel for positioning said first sheet side within said first case chamber and said second sheet side within said second case chamber; and
said first case chamber and said second case chamber housing and protecting the electrical pedal component.

20. A receptacle for receiving an object, a surface supporting the receptacle, the receptacle, comprising:
a flexible sheet defining a top surface, a bottom surface and an outer edge;
said flexible sheet having a first sheet half and a second sheet half coupled by a crease area;
a top hook and loop layer coupling to said top surface of said flexible sheet;
an object hook and loop layer coupling to the object;
said top hook and loop layer and said object hook and loop layer interlocking for coupling the object to said flexible sheet;
a carrier defining an exterior surface, an interior surface and an outer rim;
said carrier having a first carrier panel and a second carrier panel coupled by a carrier spine;
a first sheet hook and loop layer coupling to said bottom surface and said first sheet half of said flexible sheet;
a carrier hook and loop layer coupling to said interior surface and said first carrier panel of said carrier;
said first sheet hook and loop layer removably coupling with said carrier look and loop layer for defining a static attachment between said flexible sheet and said carrier;
a second sheet hook and loop layer coupling to said bottom surface and said second sheet half of said flexible sheet;
a band hook and loop coupling to said interior surface and said second carrier panel of said carrier;
said band hook and loop defining a flexible hook and loop belt positioning between a first mounting end and a second mounting end;
said first mounting end and said second mounting end coupling to said interior surface and said second carrier panel of said carrier for defining a bulbous loop in said flexible hook and loop belt that is distanced from said interior surface;
said second sheet hook and loop layer removably coupling with said flexible hook and loop belt for defining a dynamic attachment between said flexible sheet and said carrier;
said flexible sheet and said carrier folding upon said crease area and said carrier spine respectively for positioning said first sheet half adjacent to said second sheet half of said flexible sheet and said first carrier panel adjacent to said second carrier panel of said carrier for defining a fold position;
said first sheet half, said second sheet half and said crease area of said flexible sheet aligning and said first carrier panel, said second carrier panel and said carrier spine of said carrier aligning for defining an utility position when the surface supports said carrier;
said bulbous loop having a first yieldable position during a time when said carrier and said flexible sheet are in said folded position;
said bulbous loop having a second yieldable position during said carrier and said flexible sheet are in said utility position; and
said dynamic attachment permitting the independent displacement of said flexible sheet relative to said carrier during transitioning between said folding position and said utility position.

21. A receptacle for receiving an object as set forth in claim 20, further including a gripper layer coupling to said bottom surface of said flexible sheet for resisting displacement of said flexible sheet relative to the surface after removing said flexible sheet from said carrier and positioning said flexible sheet on the surface.

22. A receptacle for receiving an object as set forth in claim 20, further including a third sheet hook and loop layer coupling to said bottom surface and said second sheet half of said flexible sheet;
a second band hook and loop coupling to said interior surface and said second carrier panel of said carrier;
said second hand hook and loop defining a second flexible hook and loop belt positioning between a first mounting end and a second mounting end;
said first mounting end and said second mounting end of said second band hook and loop coupling to said interior surface and said second carrier panel of said carrier for defining a second bulbous loop in said second flexible hook and loop belt that is distanced from said interior surface; and
said third sheet hook and loop layer removably coupling with said second flexible hook and loop belt for defining a second dynamic attachment between said flexible sheet and said carrier.

23. A receptacle for receiving an object as set forth in claim 20, further including a zipper having a first spine zipper portion in said carrier spine, an outer rim zipper portion in said outer rim and a second spine zipper portion in said carrier spine;
said first spine zipper portion and said second spine zipper portion permitting said first carrier panel, said carrier spine and said second carrier panel to continuously abut the surface for defining a continuous linear mat.

24. A receptacle for receiving an object as set forth in claim 20, wherein said flexible sheet including a sheet fold for defining a crease interposed between said first sheet half and said second sheet half;
said first sheet half and said second sheet half defining a sheet channel for housing and protecting the object;
an insert panel defining a first panel surface, a second panel surface and an outer edge;
said insert panel positioning within said sheet channel for defining a first insert channel between said first sheet half and said first panel surface of said insert panel and a second insert channel between said second sheet half and said second panel surface of said insert panel; and
said first insert channel and said second insert channel housing and protecting the object.

25. A mat for engaging an object, a surface supporting the mat, the mat, comprising:

a flexible sheet defining a top surface, a bottom surface and an outer edge;

a gripper layer coupling to said bottom surface for resisting displacement of said flexible sheet relative to the surface;

a top hook and loop layer coupling to said top surface of said flexible sheet;

an object hook and loop layer coupling to the object;

said top hook and loop layer and said object hook and loop layer interlocking for coupling the object to said flexible sheet;

said flexible sheet including a sheet fold for defining a crease interposed between a first sheet side and a second sheet side;

said first sheet side and said second sheet side defining a sheet channel for housing and protecting the object;

an insert panel defining a first panel surface, a second panel surface and an outer edge;

said insert panel positioning within said sheet channel for defining a first insert channel between said first sheet side and said first panel surface of said insert panel and a second insert channel between said second sheet side and said second panel surface of said insert panel; and said first insert channel and said second insert channel housing and protecting the object.

26. A mat for engaging an object, a surface supporting the mat, the mat, comprising:

a flexible sheet defining a top surface, a bottom surface and an outer edge;

a gripper layer coupling to said bottom surface for resisting displacement of said flexible sheet relative to the surface;

a top hook and loop layer coupling to said top surface of said flexible sheet;

an object hook and loop layer coupling to the object;

said top hook and loop layer and said object hook and loop layer interlocking for coupling the object to said flexible sheet;

a flexible cap sheet defining a top cap surface, a bottom cap surface and an outer cap edge;

a bottom cap hook and loop layer coupling to said bottom cap surface for interlocking with said top hook and loop layer of said flexible sheet for coupling said flexible cap sheet to said flexible sheet;

a top cap hook and loop layer coupling to said top cap surface of said flexible cap sheet;

an object cap hook and loop layer coupling to the object; and said top cap hook and loop layer and said object cap hook and loop layer interlocking for coupling the Object to said flexible cap sheet.

27. A mat for engaging an object, a surface supporting the mat, the mat, comprising:

a flexible sheet defining a top surface, a bottom surface and an outer edge;

a gripper layer coupling to said bottom surface for resisting displacement of said flexible sheet relative to the surface;

a top hook and loop layer coupling to said top surface of said flexible sheet;

an object hook and loop layer coupling to the object;

said top book and loop layer and said object hook and loop layer interlocking for coupling the object to said flexible sheet, a flexible cap sheet defining a top cap surface, a bottom cap surface and an outer cap edge;

a bottom cap hook and loop layer coupling to said bottom cap surface for interlocking with said top hook and loop layer of said flexible sheet for coupling said flexible cap sheet to said flexible sheet;

a top cap hook and loop layer coupling to said top cap surface of said flexible cap sheet;

said top cap hook and loop layer and said object hook and loop layer interlocking for coupling the object to said flexible cap sheet;

said flexible cap sheet including a cap fold for defining a cap crease interposed between a first cap side and a second cap side;

said first cap side and said second cap side defining a cap channel for housing and protecting the object;

a first cap handle secured to said first cap side;

a second cap handle secured to said second cap side; and said first cap handle and said second cap handle positioned adjacent to said outer edge on said flexible cap sheet for grasping said flexible cap sheet when said flexible cap sheet having said cap fold.

28. An electrical pedal mat for engaging an electrical pedal component, the electrical pedal component electrically coupled to a musical instrument by an electrical conduit, a surface supporting the electrical pedal mat the electrical pedal mat comprising:

a flexible sheet defining an upper flexible sheet and a lower flexible sheet;

said upper flexible sheet having a top surface, a bottom surface and an outer edge;

said lower flexible sheet having a top surface, a bottom surface and an outer edge;

said upper flexible sheet coupling to said lower flexible sheet with said bottom surface of said upper flexible sheet positioned adjacent to said top surface of said lower flexible sheet for defining a flexible sheet chamber there between;

a top hook and loop layer coupling to said top surface of said upper flexible sheet;

a pedal hook and loop layer coupling to the electrical pedal component; and said top hook and loop layer and said pedal hook and loop layer interlocking for coupling the electrical pedal component to said upper flexible sheet.

* * * * *